(12) United States Patent
Teng et al.

(10) Patent No.: US 12,417,611 B2
(45) Date of Patent: Sep. 16, 2025

(54) METHOD AND APPARATUS FOR CHARACTER SELECTION BASED ON CHARACTER RECOGNITION, AND TERMINAL DEVICE

(71) Applicant: HUAWEI TECHNOLOGIES CO., LTD., Guangdong (CN)

(72) Inventors: Yihua Teng, Shanghai (CN); Fangyu Hong, Shanghai (CN); Xiaohui Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/912,265

(22) PCT Filed: Mar. 5, 2021

(86) PCT No.: PCT/CN2021/079294
§ 371 (c)(1),
(2) Date: Sep. 16, 2022

(87) PCT Pub. No.: WO2021/185098
PCT Pub. Date: Sep. 23, 2021

(65) Prior Publication Data
US 2023/0169785 A1    Jun. 1, 2023

(30) Foreign Application Priority Data
Mar. 18, 2020   (CN) .......................... 202010192726.5

(51) Int. Cl.
G06V 10/26    (2022.01)
G06T 7/70     (2017.01)
(Continued)

(52) U.S. Cl.
CPC ................ *G06V 10/26* (2022.01); *G06T 7/70* (2017.01); *G06T 11/001* (2013.01); *G06V 10/24* (2022.01);
(Continued)

(58) Field of Classification Search
CPC ...... G06F 18/241; G06N 3/0464; G06N 3/08; G06T 7/70; G06T 11/001;
(Continued)

(56) References Cited

U.S. PATENT DOCUMENTS 10,671,878 B1 *  6/2020  Sarshogh .............. G06F 18/217
2016/0259971 A1  9/2016  Kim et al.
(Continued)

FOREIGN PATENT DOCUMENTS

CN    105809164 A    7/2016
CN    106469310 A    3/2017
(Continued)

OTHER PUBLICATIONS

Espacenet machine translation of CN10/9033798 (Year: 2024).*
(Continued)

*Primary Examiner* — Katrina R Fujita
(74) *Attorney, Agent, or Firm* — WOMBLE BOND DICKINSON (US) LLP

(57) ABSTRACT

Embodiments of this application are applicable to the field of artificial intelligence technologies, and provide a method and an apparatus for character selection based on character recognition, and a terminal device. The method includes: obtaining a connectionist temporal classification sequence corresponding to text content in an original picture; calculating character coordinates of each character in the connectionist temporal classification sequence; mapping the character coordinates of each character to the original picture, to obtain target coordinates of each character in the
(Continued)

original picture; and generating a character selection control in the original picture based on the target coordinates. The character selection control is used to indicate a user to select a character in the original picture. By using the foregoing method, when the user manually selects the character, precision of positioning the character can be improved, and efficiency and accuracy of manually selecting the character can be improved.

20 Claims, 17 Drawing Sheets

(51) Int. Cl.
*G06T 11/00* (2006.01)
*G06V 10/24* (2022.01)
*G06V 10/82* (2022.01)
*G06V 30/14* (2022.01)
*G06V 30/148* (2022.01)
*G06V 30/19* (2022.01)

(52) U.S. Cl.
CPC .......... *G06V 10/82* (2022.01); *G06V 30/1456* (2022.01); *G06V 30/15* (2022.01); *G06V 30/19173* (2022.01); *G06T 2207/20084* (2013.01); *G06T 2207/30176* (2013.01)

(58) Field of Classification Search
CPC ........... G06T 2207/20084; G06T 2207/30176; G06V 10/24; G06V 10/26; G06V 10/82; G06V 30/1456; G06V 30/153; G06V 30/18076; G06V 30/19173; G06V 30/1983; G06V 30/287
See application file for complete search history.

(56) References Cited

U.S. PATENT DOCUMENTS

| | | |
|---|---|---|
| 2018/0121744 A1 | 5/2018 | Kim et al. |
| 2018/0137349 A1* | 5/2018 | Such .................... G06V 30/414 |
| 2018/0137353 A1* | 5/2018 | Nagao .................. G06F 18/214 |
| 2019/0065441 A1 | 2/2019 | Kim |
| 2019/0095753 A1* | 3/2019 | Wolf ...................... G06V 10/82 |
| 2020/0226400 A1* | 7/2020 | Corring ................. G06V 10/82 |
| 2021/0124972 A1* | 4/2021 | Liu ....................... G06V 30/153 |
| 2021/0133476 A1* | 5/2021 | Goodman ........... G06F 18/2411 |
| 2021/0224568 A1* | 7/2021 | Zhang ..................... G06V 20/63 |
| 2021/0326655 A1* | 10/2021 | Xie ..................... G06V 30/1478 |
| 2022/0083153 A1* | 3/2022 | Kim ...................... G06N 3/044 |

FOREIGN PATENT DOCUMENTS

| | | |
|---|---|---|
| CN | 106778728 A | 5/2017 |
| CN | 108182437 A | 6/2018 |
| CN | 109033798 A | 12/2018 |
| CN | 109902622 A | 6/2019 |
| CN | 110032324 A | 7/2019 |

OTHER PUBLICATIONS

Qi Xianbiao et al:"A Novel Joint Character Categorization and Localization Approach for Character-Level Scene Text Recognition", 2019 International Conference on Document Analysis and Recognition Workshops, Sep. 22, 2019, XP033649139, 8 pages.

Baoguang Shi et al, An End-to-End Trainable Neural Network for Image-based Sequence Recognition and Its Application to Scene Text Recognition, arXiv:1507.05717v1 [cs.CV] Jul. 21, 2015, 9 pages.

Awni Hannun, Sequence Modeling With CTC, https://distill.pub/2017/ctc/, 2017, 20 pages.

* cited by examiner

METHOD AND APPARATUS FOR CHARACTER SELECTION BASED ON CHARACTER RECOGNITION, AND TERMINAL DEVICE

CROSS-REFERENCE TO RELATED APPLICATIONS

This application is a national stage of International Application No. PCT/CN2021/079294, filed on Mar. 5, 2021, which claims priority to Chinese Patent Application No. 202010192726.5, filed on Mar. 18, 2020. Both of the aforementioned applications are hereby incorporated by reference in their entireties.

TECHNICAL FIELD

This application relates to the field of artificial intelligence technologies, and in particular, to a method and an apparatus for character selection based on character recognition, and a terminal device.

BACKGROUND

Optical character recognition (OCR) is a process of checking a character on paper by using an electronic device such as a mobile phone, a scanner, or a digital camera, determining a shape of the character based on a dark or bright pattern of the character, and then translating the shape into a computer word by using a character recognition method. OCR is an important application scenario in the computer vision (CV) field, and provides a basic capability for applications of an augmented reality (AR) technology in many fields such as translation and image semantic understanding. Generally, OCR may include two operations, namely, text area detection and word content recognition. The former operation may detect where a text area is in an image, and the latter operation may recognize what content of a text in the text area is.

An application of OCR in an object recognition scenario of a smart lens of a mobile phone is used as an example. The smart lens may complete multi-object detection and text detection and recognition tasks in an AR scenario. Moreover, the smart lens may further display positions of objects and text boxes. If a user taps a text line on a screen of the mobile phone, the screen is framed. In this case, the user may perform selection, that is, perform tapping and dragging to select detected and recognized word content in a manual selection manner, whose effect is similar to a function of dragging a mouse to select text content character by character in a text document. The user may perform a subsequent operation such as copying, translation, or searching on the selected content.

At present, there are a plurality of different word selection solutions provided by a plurality of vendors. However, there are more or less problems with the solutions. For example, some smart lens-based word selection solutions provided by vendors do not support character-level selection, but support only selection on an entire text line as a minimum unit. For some other word selection solutions provided by vendors, special symbols such as Chinese and English punctuation marks cannot be selected, though a character-level word selection function is supported. In some scenarios, segmentation between words or between a word and a punctuation mark cannot be accurately implemented.

SUMMARY

Embodiments of this application provide a method and an apparatus for character selection based on character recognition, and a terminal device, to resolve problems of inaccurate character positioning and relatively low selection efficiency and accuracy during manual selection on a word recognized through OCR in conventional technologies.

According to a first aspect, an embodiment of this application provides a method for character selection based on character recognition, applied to a terminal device. The method includes:

A connectionist temporal classification (CTC) sequence corresponding to text content in an original picture is obtained, and character coordinates of each character in the CTC sequence are calculated, so that the character coordinates of each character may be mapped to the original picture, to obtain target coordinates of each character in the original picture, and then a character selection control may be generated in the original picture based on the target coordinates, to indicate a user to manually select a character in the original picture.

In the method for character selection based on character recognition that is provided in an embodiment of the application, the coordinates of each character in the text content in the CTC corresponding to the text content are calculated, and then the target coordinates of each character in the original picture are obtained based on a correspondence between the CTC sequence and the text content in the original picture, thereby improving accuracy of calculating the target coordinates, and improving precision of the character selection control drawn based on the target coordinates, so that when the user selects a character in the original picture, the terminal device can accurately position the character, and output the selected character, thereby improving efficiency and accuracy of character selection and recognition.

In an embodiment of the first aspect, an OCR detection model configured on the terminal device may detect the original picture, to generate a to-be-recognized picture including the text content in the original picture, the to-be-recognized picture may be used as input data of an OCR recognition model, and the OCR recognition model may recognize the text content, to obtain the CTC sequence corresponding to the text content. In the method for character selection based on character recognition that is provided in an embodiment of the application, the OCR detection model and the OCR recognition model that are configured on the terminal device may be directly used, thereby helping expand an application scope of the method and reduce technical difficulty of using the method by the terminal device.

In an embodiment of the first aspect, the CTC sequence corresponding to the text content may be a sequence obtained after an initial CTC sequence output by the OCR recognition model is processed. The initial CTC sequence may be processed by using a character selection model provided in an embodiment of the application. The OCR recognition model may recognize the text content, to output the initial CTC sequence. Then, the character selection model may determine a length of the initial CTC sequence and a picture width of the to-be-recognized picture, and determine whether a product between the length of the initial CTC sequence and a downsampling rate of the character selection model is greater than the picture width of the to-be-recognized picture. If the product is greater than the picture width of the to-be-recognized picture, the initial CTC sequence needs to be cropped, so that a product between a length of a cropped CTC sequence and the downsampling rate of the model is less than or equal to the picture width of the to-be-recognized picture.

In an embodiment of the first aspect, the CTC sequence may be cropped by sequentially cropping a head element or a tail element of the initial CTC sequence. For the initial CTC sequence that needs to be cropped, a head element of the sequence may be cropped first, and then a tail element may be cropped. Alternatively, a tail element of the sequence may be cropped first, and then a head element may be cropped. Each time a head element or a tail element is cropped, whether a product of a length of a cropped sequence and the preset downsampling rate is less than or equal to the picture width of the to-be-recognized picture may be recalculated. If a product of a length of a sequence obtained after a cropping and the preset downsampling rate is less than or equal to the picture width of the to-be-recognized picture, the cropping may be stopped, and the current obtained CTC sequence is output as the CTC sequence corresponding to the text content. If the product of the length of the sequence obtained after the cropping and the preset downsampling rate is still greater than the picture width of the to-be-recognized picture, a further cropping needs to be performed in the foregoing order until a product of a length of a sequence and the downsampling rate is less than or equal to the picture width of the to-be-recognized picture.

In an embodiment of the application, the CTC sequence is partially cropped, so that a data amount in subsequent processing may be reduced, to improve processing efficiency.

In an embodiment of the first aspect, after the CTC sequence is cropped, parameters may be initialized. Parameters that need to be initialized may include a left boundary, a right boundary, a current state, a previous state, a coordinate array, a content array, and the like.

In an embodiment of the first aspect, the character coordinates of each character in the CTC sequence may be calculated by determining a left boundary coordinate and a right boundary coordinate of each character in the CTC sequence. Character coordinates of each character in the to-be-recognized picture may be obtained with reference to the left boundary coordinate and the right boundary coordinate of each character in the CTC sequence.

In an embodiment of the first aspect, a character boundary of each character in the CTC sequence may be obtained by determining a right boundary of the character and a left boundary of an adjacent next character. For any character in the CTC sequence, an original right boundary coordinate of the character and an original left boundary coordinate of a next character may be obtained first, then an average of the original right boundary coordinate and the original left boundary coordinate is calculated, and the average may be finely adjusted, to obtain a right boundary coordinate of the character and a left boundary coordinate of the next character.

In an embodiment of the first aspect, the boundary of each character may be finely adjusted based on different character types. Therefore, when boundaries of the characters are finely adjusted, a first character type of the character and a second character type of the next character may be determined respectively. If the first character type and the second character type are different, the two have different offsets. If the two have a same character type, the two have a same offset. For the current character, the average minus an offset corresponding to the first character type of the current character may be calculated, to obtain a first difference, and then the first difference is used as the right boundary coordinate of the current character after the fine adjustment. For the adjacent next character, the average plus an offset corresponding to the second character type may be calculated, to obtain a second sum, and then the second sum is used as the left boundary coordinate of the next character after the fine adjustment.

Due to a correspondence between the character coordinates of each character in the CTC sequence and the coordinates of the character in the original picture, in an embodiment of the application, the boundary of each character in the CTC sequence is finely adjusted, to avoid a problem of a boundary overlap between adjacent characters or a failure of the character selection control generated based on the target coordinates to completely cover a character when the character is selected in a subsequent processing process, thereby ensuring accuracy of character positioning.

In an embodiment of the first aspect, to ensure that a final area corresponding to the coordinates obtained through mapping can completely cover a pixel of each character, coordinates of a head character and a tail character may be further finely adjusted, that is, a left boundary coordinate of the head character is decreased, and a right boundary coordinate of the tail character is increased.

In an embodiment of the first aspect, because the coordinates of each character in the CTC sequence are obtained after processing by the OCR recognition model based on a downsampling rate, when the character coordinates of each character in the to-be-recognized picture are calculated based on character boundary coordinates of each character, the left boundary coordinate and the right boundary coordinate of each character may be respectively multiplied by the preset downsampling rate, to obtain first vertex coordinates and second vertex coordinates, that is, lower left vertex coordinates and lower right vertex coordinates, of each character in the to-be-recognized picture. On this basis, third vertex coordinates and fourth vertex coordinates, that is, upper left vertex coordinates and upper right vertex coordinates, of each character in the to-be-recognized picture may be determined with reference to a picture height of the to-be-recognized picture. The coordinates of the four vertexes of each character are determined, thereby improving accuracy of character positioning, and ensuring that when a character is selected, the character selection control can completely cover an area in which the character is located.

In an embodiment of the first aspect, mapping the character coordinates of each character to the original picture and detecting the original picture to generate the to-be-recognized picture belong to two opposite processes. Therefore, when the character coordinates of each character are mapped to the original picture to obtain the target coordinates of each character in the original picture, a perspective transformation matrix used when the original picture is transformed into the to-be-recognized picture may be first determined based on the original picture and the to-be-recognized picture, and then the character coordinates of each character are multiplied by the perspective transformation matrix, to obtain the target coordinates of each character in the original picture. Processing is performed between the data based on the same perspective transformation matrix, thereby ensuring accuracy of calculation and accuracy of the correspondence between the character coordinates and the target coordinates.

In an embodiment of the first aspect, the character selection control may be presented by using different background colors. When the character selection control is generated in the original picture, a character area of each character may be drawn in a first color based on the target coordinates. The first color may be any color, but it should be noted that after the character area is drawn in the first color, inconvenience caused to character recognition of the user due to the first color should be avoided. In an embodiment of the application, the character selection control is generated in the original picture, so that the user may be prompted which area is a recognized text area, making it convenient for the user to select a character in the area.

In an embodiment of the first aspect, after generating the character selection control in the original picture, the terminal device may listen to a tap event of the user in a character area in real time. When detecting through listening that the user taps a character area, the terminal device may redraw a background color of the area, to distinguish from another area that is not tapped. For example, an entire line of character areas including the tapped character area may be drawn in a second color different from the first color. Then, the terminal device continues to listen and detect whether a drag event exists in the character area corresponding to the second color. If a drag event exists, the character area covered by the second color may be adjusted based on the drag event. An adjusted character area is a character area that the user expects to select. For each character in the adjusted character area covered by the second color, a result obtained through recognition by the OCR recognition model may be output, and the result is presented in a display interface of the terminal device.

In an embodiment of the application, the character selection control in the first color is drawn in the original picture, to prompt the user which area has a character available for selection. When a tap event of the user is detected through listening, an entire line of word areas in a corresponding area may be drawn in the second color based on different tap positions, to notify the user of which character content is currently selected. In addition, based on an actual requirement, the user may adjust the selected character content through dragging in the character area drawn in the second color. In an embodiment of the application, interaction with the user is implemented in a terminal interface, thereby improving operation convenience of character selection.

According to a second aspect, an embodiment of this application provides a method for character selection based on character recognition, applied to a terminal device. The method includes:

The terminal device is controlled, according to a user instruction, to capture an original picture, present the original picture in a display interface of the terminal device, and then determine target coordinates, in the original picture, of each character in to-be-recognized text content included in the original picture, so that a character selection control for each character may be generated in the original picture based on the target coordinates, to indicate a user to select a character in the original picture. When a selection event of the user for a target character is detected through listening, the selected target character may be output in real time. The target character may be any one or more of all the characters.

In an embodiment of the application, the target coordinates of each character in the original picture are determined, so that the corresponding character selection control may be generated in the interface of the terminal based on the target coordinates, to prompt the user that the character may be selected, thereby reducing operation difficulty when the user selects the character, and improving convenience of the selection operation.

In an embodiment of the second aspect, the determining target coordinates, in the original picture, of each character in text content includes: First, a CTC sequence corresponding to the text content may be obtained by using an OCR recognition model, and after processing such as cropping and parameter initialization is performed on the CTC sequence, character coordinates of each character in the CTC sequence may be calculated. Then, the character coordinates of each character are mapped to the original picture, to obtain the target coordinates of each character in the original picture. Based on the target coordinates, a character selection model may draw, in the original picture, that is, in the display interface of the terminal device, a character selection control available for selection by the user.

In an embodiment of the second aspect, that a character selection control for each character is generated in the original picture based on the target coordinates may be drawing a character area of each character in a first color based on the target coordinates, to prompt the user which area has a character available for selection.

In an embodiment of the second aspect, after drawing the character selection control available for selection by the user, the terminal device may listen and detect in real time whether a tap event of the user exists in any character area. If it is detected through listening that a tap event is generated in a character area, an entire line of character areas including the tapped character area may be drawn in a second color, to prompt the user which characters are currently selected. In addition, within a time range, the terminal device may continue to listen and detect whether a drag event exists in the character area corresponding to the second color. If a drag event exists, which may indicate that the user adjusts the selected characters, the character area covered by the second color may be redrawn based on a position of the drag, and a target character in the character area is recognized and presented, making it convenient for the user to perform another operation based on the selection result.

According to a third aspect, an embodiment of this application provides an apparatus for character selection based on character recognition, applied to a terminal device. The apparatus includes:

a connectionist temporal classification sequence obtaining module, configured to obtain a connectionist temporal classification sequence corresponding to text content in an original picture;

a character coordinate calculation module, configured to calculate character coordinates of each character in the connectionist temporal classification sequence;

a target coordinate determining module, configured to map the character coordinates of each character to the original picture, to obtain target coordinates of each character in the original picture; and a character selection control generation module, configured to generate a character selection control in the original picture based on the target coordinates, where the character selection control is used to indicate a user to select a character in the original picture.

In an embodiment of the third aspect, the connectionist temporal classification sequence obtaining module includes the following submodules:

a to-be-recognized picture generation submodule, configured to detect the original picture to generate a to-be-recognized picture including the text content; and a connectionist temporal classification sequence obtaining submodule, configured to recognize the text content to obtain the connectionist temporal classification sequence corresponding to the text content.

In an embodiment of the third aspect, the connectionist temporal classification sequence obtaining submodule includes the following units:

an initial connectionist temporal classification sequence obtaining unit, configured to recognize the text content to obtain an initial connectionist temporal classification sequence;

a sequence length determining unit, configured to determine a length of the initial connectionist temporal classification sequence;

a picture width determining unit, configured to determine a picture width of the to-be-recognized picture; and a sequence cropping unit, configured to: if a product of the length of the initial connectionist temporal classification sequence and a preset downsampling rate is greater than the picture width of the to-be-recognized picture, crop the initial connectionist temporal classification sequence to obtain the connectionist temporal classification sequence corresponding to the text content.

A product of a length of the connectionist temporal classification sequence obtained after cropping and the preset downsampling rate is less than or equal to the picture width of the to-be-recognized picture.

In an embodiment of the third aspect, the sequence cropping unit includes the following subunits:

a cropping subunit, configured to sequentially crop a head element or a tail element of the initial connectionist temporal classification sequence;

a calculation subunit, configured to: after any head element or tail element is cropped, perform calculation to determine whether a product of a length of a cropped initial connectionist temporal classification sequence and the preset downsampling rate is less than or equal to the picture width of the to-be-recognized picture; and an output subunit, configured to: if the product of the length of the cropped initial connectionist temporal classification sequence and the preset downsampling rate is less than or equal to the picture width of the to-be-recognized picture, stop cropping, and output the connectionist temporal classification sequence corresponding to the text content.

In an embodiment of the third aspect, the character coordinate calculation module includes the following submodules:

a character boundary coordinate determining submodule, configured to determine character boundary coordinates of each character in the connectionist temporal classification sequence, where the character boundary coordinates include a left boundary coordinate and a right boundary coordinate; and a character coordinate calculation submodule, configured to calculate character coordinates of each character in the to-be-recognized picture based on the character boundary coordinates of each character.

In an embodiment of the third aspect, the character boundary coordinate determining submodule includes the following units:

an original boundary coordinate obtaining unit, configured to: for any character in the connectionist temporal classification sequence, obtain an original right boundary coordinate of the character and an original left boundary coordinate of a next character;

an original boundary coordinate average calculation unit, configured to calculate an average of the original right boundary coordinate and the original left boundary coordinate; and a boundary coordinate determining unit, configured to determine a right boundary coordinate of the character and a left boundary coordinate of the next character based on the average.

In an embodiment of the third aspect, the boundary coordinate determining unit includes the following subunits:

a character type determining subunit, configured to respectively determine a first character type of the character and a second character type of the next character, where the first character type and the second character type respectively have corresponding offsets;

a right boundary coordinate calculation subunit, configured to calculate the average minus the offset corresponding to the first character type to obtain a first difference, and use the first difference as the right boundary coordinate of the character; and a left boundary coordinate calculation subunit, configured to calculate the average plus the offset corresponding to the second character type to obtain a second sum, and use the second sum as the left boundary coordinate of the next character.

In an embodiment of the third aspect, the character coordinates of each character in the to-be-recognized picture include first vertex coordinates, second vertex coordinates, third vertex coordinates, and fourth vertex coordinates.

The character coordinate calculation submodule includes the following units:

a first vertex coordinate and second vertex coordinate calculation unit, configured to respectively multiply the left boundary coordinate and the right boundary coordinate of each character by the preset downsampling rate, to obtain the first vertex coordinates and the second vertex coordinates of each character in the to-be-recognized picture; and a third vertex coordinate and fourth vertex coordinate calculation unit, configured to determine the third vertex coordinates and the fourth vertex coordinates of each character in the to-be-recognized picture based on the first vertex coordinates, the second vertex coordinates, and a picture height of the to-be-recognized picture.

In an embodiment of the third aspect, the target coordinate determining module includes the following submodules:

a perspective transformation matrix determining submodule, configured to determine, based on the original picture and the to-be-recognized picture, a perspective transformation matrix used when the original picture is transformed into the to-be-recognized picture; and a target coordinate calculation submodule, configured to multiply the character coordinates of each character by the perspective transformation matrix, to obtain the target coordinates of each character in the original picture.

In an embodiment of the third aspect, the character selection control generation module includes the following submodule:

a first color drawing submodule, configured to draw a character area of each character in a first color based on the target coordinates.

In an embodiment of the third aspect, the character selection control generation module includes the following submodules:

a second color drawing submodule, configured to: when a tap event of the user in a character area is detected through listening, draw an entire line of character areas including the tapped character area in a second color;

a character area adjustment submodule, configured to listen to a drag event of the user in the character area corresponding to the second color, and adjust, based on the drag event, the character area covered by the second color; and a character recognition submodule, configured to recognize and present each character in the character area covered by the second color.

According to a fourth aspect, an embodiment of this application provides an apparatus for character selection based on character recognition, applied to a terminal device. The apparatus includes:

an original picture presentation module, configured to present an original picture in a display interface of the terminal device, where the original picture includes to-be-recognized text content;

a target coordinate determining module, configured to determine target coordinates, in the original picture, of each character in the text content;

a character selection control generation module, configured to generate a character selection control for each character in the original picture based on the target coordinates, where the character selection control is used to indicate a user to select a character in the original picture; and a target character output module, configured to: when a selection event of the user for a target character is detected through listening, output the selected target character, where the target character is any one or more of all the characters.

In an embodiment of the fourth aspect, the target coordinate determining module includes the following submodules:

a connectionist temporal classification sequence obtaining submodule, configured to obtain a connectionist temporal classification sequence corresponding to the text content;

a character coordinate calculation submodule, configured to calculate character coordinates of each character in the connectionist temporal classification sequence; and a target coordinate determining submodule, configured to map the character coordinates of each character to the original picture, to obtain the target coordinates of each character in the original picture.

In an embodiment of the fourth aspect, the character selection control generation module includes the following submodule:

a first color drawing submodule, configured to draw a character area of each character in a first color based on the target coordinates.

In an embodiment of the fourth aspect, the target character output module includes the following submodules:

a second color drawing submodule, configured to: when a tap event of the user in a character area is detected through listening, draw an entire line of character areas including the tapped character area in a second color;

a character area adjustment submodule, configured to listen to a drag event of the user in the character area corresponding to the second color, and adjust, based on the drag event, the character area covered by the second color; and a target character recognition submodule, configured to recognize and present a target character in the character area covered by the second color.

According to a fifth aspect, an embodiment of this application provides a terminal device, including a memory, a processor, and a computer program that is stored in the memory and can run on the processor. When executing the computer program, the processor implements the method for character selection based on character recognition according to the first aspect or the second aspect.

According to a sixth aspect, an embodiment of this application provides a computer-readable storage medium. The computer-readable storage medium stores a computer program, and when the computer program is executed by a processor of a terminal device, the method for character selection based on character recognition according to the first aspect or the second aspect is implemented.

According to a seventh aspect, an embodiment of this application provides a computer program product. When the computer program product runs on a terminal device, the terminal device is enabled to perform the method for character selection based on character recognition according to the first aspect or the second aspect.

Compared with the conventional technologies, the embodiments of this application include the following beneficial effects:

In the embodiments of this application, a mapping relationship between an index in a CTC sequence output by an OCR detection and recognition model and coordinates in an original picture is established based on a characteristic of CNN downsampling (eight times) by using an existing convolutional neural network (CNN) structure in the OCR detection and recognition model. The model used in the entire process is simple and an amount of data that needs to be labeled is small. During processing, compared with a solution in a conventional technology in which an original picture or a corrected picture needs to be provided, or all pixels in a picture need to be traversed, in the embodiments of this application, a picture detected or captured in real time may be used. This has a fast calculation speed, and may be quickly and conveniently adapted and deployed to an existing OCR model. Second, in the embodiments of this application, when a character boundary is determined, the character boundary may be finely adjusted by setting a hyperparameter based on different languages, to ensure accuracy of character boundary recognition, which not only is applicable to most languages, but also supports symbol selection. Third, in the embodiments of this application, boundary coordinates of each character are recorded and mapped to the original picture to obtain coordinates of each character in the original picture, so that a granularity of coordinate output is finer, and when a manual selection operation is performed, recognition between words and between a word and a symbol is accurate, thereby quickly implementing segmentation between adjacent characters, and achieving stronger universality in practical application. Fourth, thanks to robustness of the OCR detection and recognition model, the method for character selection that is provided in the embodiments of this application also has stronger robustness for character positioning in a natural scenario. Fifth, in the embodiments of this application, the coordinates of each character that are obtained through recognition are associated with the target coordinates of each character in the original picture, and a corresponding recognized text area is drawn based on the target coordinates, so that a user may be supported in arbitrary selection and range adjustment in the recognized text area. Sixth, the word recognition and selection scenario may be further associated with functions such as translation and question scanning. After the user performs selection, a selected word may be translated or a recognized question may be solved directly. Alternatively, a character string selected by the user is parsed, and if text content in a format such as a phone number or an email address is included, a separate card may be further extracted, making it convenient for the user to directly make a call or send an email, which is relatively easy to use and practical.

DESCRIPTION OF EMBODIMENTS

In the following descriptions, to illustrate rather than limit, specific details such as a particular system structure and a technology are provided to make a thorough understanding of embodiments of this application. However, one of ordinary skilled in the art should know that this application may also be implemented in other implementations without these details. In other cases, detailed descriptions of well-known systems, apparatuses, circuits, and methods are omitted, so that this application is described without being obscured by unnecessary details.

Terms used in the following embodiments are merely intended to describe embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly. It should be further understood that in the embodiments of this application, "one or more" means one, two, or more than two; "and/or" describes an association relationship between associated objects, and represents that there may be three relationships. For example, A and/or B may represent the following three cases: Only A exists, both A and B exist, and only B exists. A and B may be singular or plural. The character "/" generally indicates an "or" relationship between associated objects.

For ease of understanding, several typical word selection solutions in conventional technologies are first described.

Figure 1:
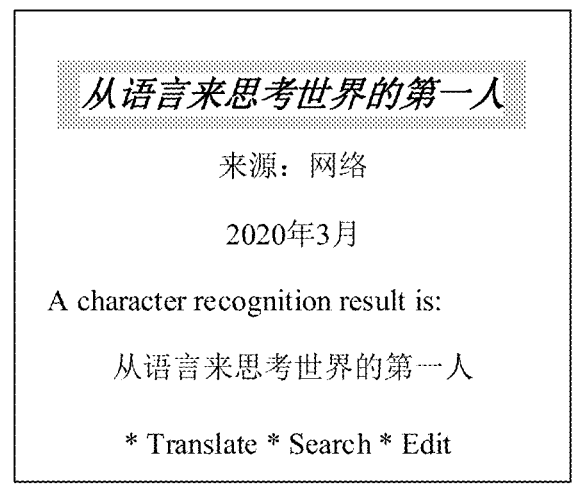
FIG. 1 is a schematic diagram of a recognition result of a word selection solution in a conventional technology.

FIG. 1 is a schematic diagram of a recognition result of a word selection solution in a conventional technology. The word selection solution shown in FIG. 1 does not support character-level selection, but supports only selection on an entire text line as a minimum unit. For example, in FIG. 1, a picture is photographed by using a smart lens, and after a screen is framed, an OCR recognition result includes three lines of words: a first line of words "从语言来思考世界的第一人", a second line of words "来源：网络", and a third line of words "2020年3月". A user may select the word content on the screen, and perform an operation such as copying, translation, editing, or reading based on a selection result. However, according to the selection solution shown in FIG. 1, the user can select only an entire line of words, for example, the first line of words "从 语言来思考世界的第一人", and cannot separately select Chinese characters in each line of words. For example, Chinese characters such as "语言" or "思考" cannot be selected separately according to the selection solution shown in FIG. 1.

Figure 2A:
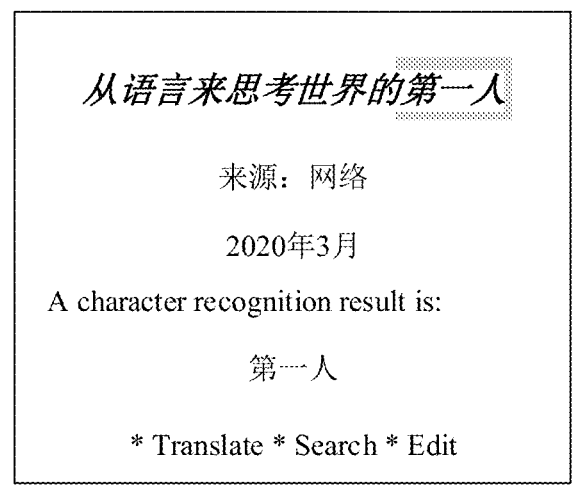
FIG. 2(a) to FIG. 2(c) are schematic diagrams of recognition results of another word selection solution in a conventional technology.
Figure 2B:
Figure 2C:
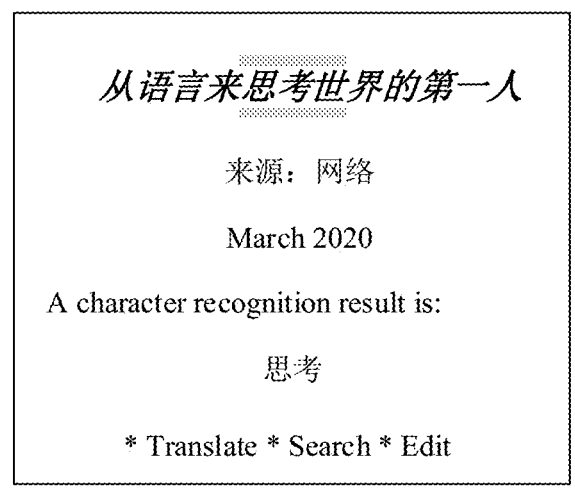

FIG. 2(a) to FIG. 2(c) are schematic diagrams of recognition results of another word selection solution in a conventional technology. The selection solution has the following defects though supporting a character-level word selection function:

(1) Selection on a symbol such as an English punctuation mark is not supported.

(2) In some scenarios, segmentation between words or between a word and a symbol such as a punctuation mark cannot be implemented.

(3) Similar to the solution shown in FIG. 1, in some scenarios, only selection on an entire line of words is supported, and some characters in the line of words cannot be selected.

(4) In scenarios of complex background, character coordinates may be easily determined inaccurately, resulting in low accuracy of selection results.

For example, in a result shown in FIG. 2(a), because segmentation between words cannot be implemented, "第一人" in FIG. 2(a) can be selected only as a whole, and each word cannot be selected separately. For another example, in a result shown in FIG. 2(b), because segmentation between a word and a symbol such as a punctuation mark cannot be implemented, when the user performs selection on "来源：网络" in the picture, "来源：" or "：网络" can be selected only as a whole, and "来源", "：", "来", or "源" cannot be selected separately. For still another example, in a result shown in FIG. 2(c), because words are not in a standard font, inaccurate positioning easily occurs when positioning is performed. As a result, when the two words "思考" are selected, a selected text box also covers another word behind.

In addition, there is also a word selection solution based on a heuristic algorithm of traversing an entire picture in a conventional technology. Main logic of the solution is to traverse the entire picture pixel by pixel, and find a boundary of each character by using a difference between pixel values. However, the solution also has the following several problems when used in the word selection:

(1) The entire picture needs to be traversed to find the word boundary, which is inefficient.

(2) When a font of to-be-recognized words is italic, ambiguity easily occurs, resulting in an inaccurate selection result.

(3) When a distance between a word and a symbol such as a punctuation mark is relatively close, a recognition result is easily ambiguous.

(4) In some natural scenarios of complex background, accurate character positioning is difficult.

Therefore, to resolve the problems existing in the selection solutions and improve efficiency and accuracy of word selection, an embodiment of this application provides a method for character selection based on a CTC sequence output by an OCR recognition model.

In the method for character selection based on character recognition that is provided in an embodiment of the application, the CTC sequence output after recognition by the OCR recognition model is mainly used, and based on the output CTC sequence, a user can perform manual selection character by character on a screen.

Connectionist temporal classification is a loss calculation method, which is mainly applied to models of sequence recognition such as word recognition and speech recognition. Most sequence recognition models use a structure of a CNN+ a recurrent neural network (RNN)+CTC. CTC Loss is used instead of Softmax Loss based on logistic regression, so that training samples do not need to be aligned. CTC Loss generally has the following two characteristics:

(1) A blank (blank) character is introduced to resolve a problem that there are no characters at some positions.

(2) A gradient is quickly calculated by using a recursive algorithm.

Figure 3:
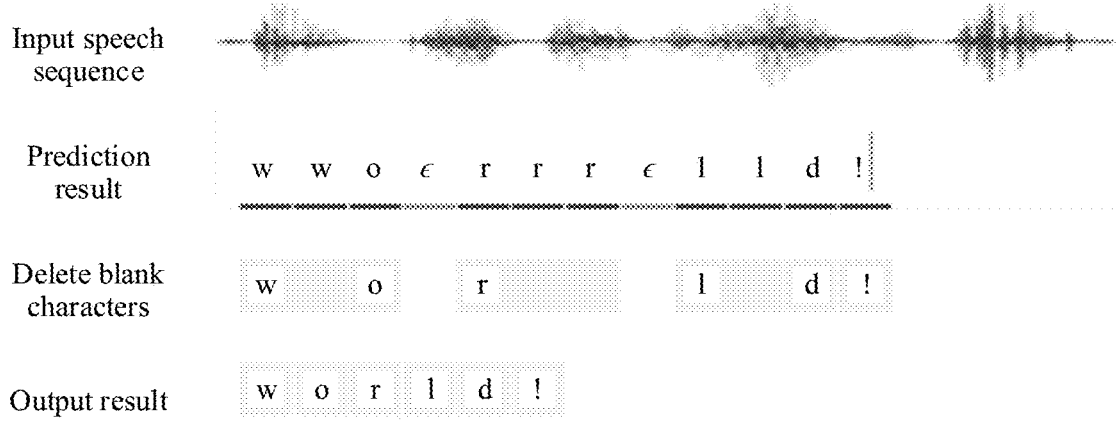
FIG. 3 is a schematic diagram of a correspondence between a CTC sequence and a word recognition or speech recognition result in a conventional technology.

FIG. 3 is a schematic diagram of a correspondence between a CTC sequence and a word recognition or speech recognition result in a conventional technology. In FIG. 3, a symbol "ϵ" represents blank, and serves as a placeholder for distinguishing duplicate characters. That is, duplicate characters between two blanks are merged into one character. For example, for an input speech sequence in FIG. 3, a corresponding text obtained through recognition is "wwo ϵ rrr ϵ lld", and after duplicate "w" and "r" between the two blanks are merged, a final recognition result, that is, a word "world", may be output.

Figure 4:
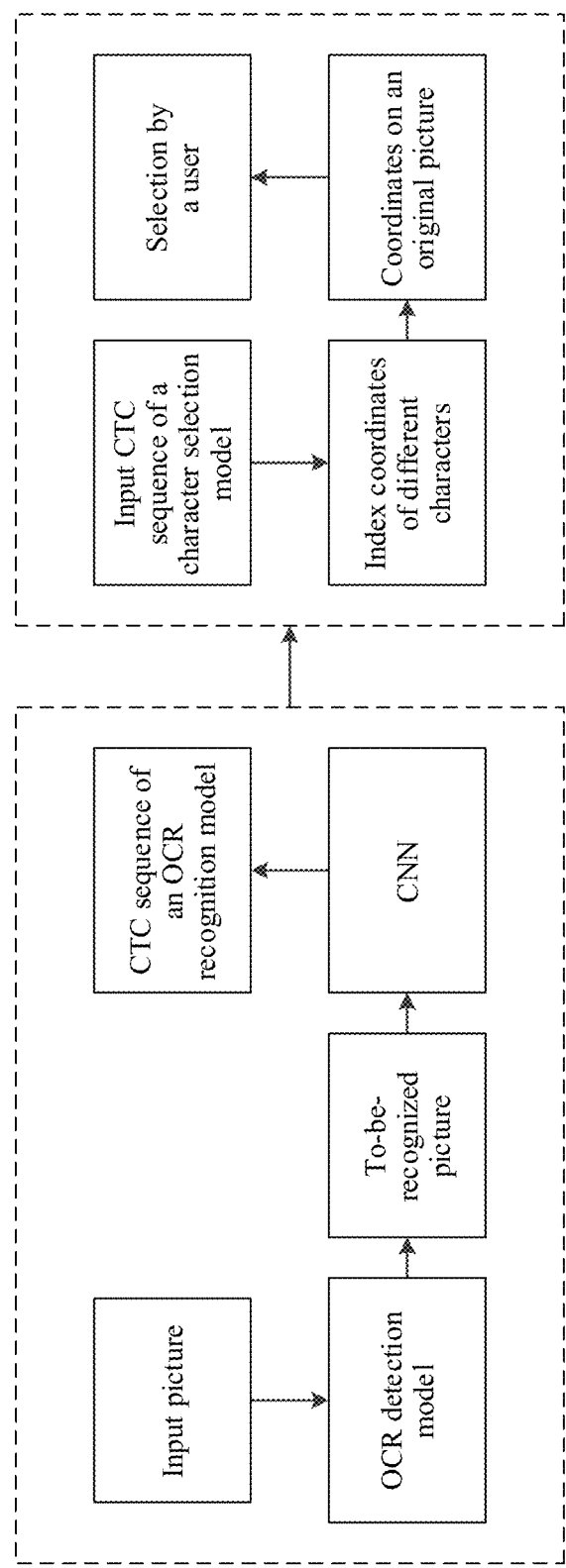
FIG. 4 is a schematic diagram of a procedure and a logical relationship between an OCR detection and recognition model and a character selection model according to an embodiment of this application.

FIG. 4 is a schematic diagram of a procedure and a logical relationship between an OCR detection and recognition model and a character selection model according to an embodiment of this application. An OCR detection model may detect an input picture to obtain a to-be-recognized picture including a text area. The input picture may be an image obtained through photographing or scanning by using a device such as a lens of a mobile phone or a scanner. The to-be-recognized picture may be considered as input data provided for processing by an OCR recognition model. After feature extraction is performed on the to-be-recognized picture by using a CNN network, the OCR recognition model may output a CTC sequence that includes a recognized character.

It should be noted that, in conventional technologies, most OCR-based detection and recognition models use CNN+ RNN+CTC to perform a sequence recognition procedure. The CNN is used for feature extraction, and the RNN and the CTC are used for sequence recognition. However, the recognition model corresponding to the method for character selection that is provided in an embodiment of the application uses only the CNN as a network structure, and directly performs a sliding window on a feature map of a last layer after 8-time downsampling, to obtain a CTC sequence. The entire recognition model is not related to any RNN structure.

The CTC sequence output by the OCR detection and recognition model may be used as an input sequence of the character selection model in an embodiment of the application. Index coordinates of different characters in the CTC sequence are determined, and may be mapped to the original picture to obtain coordinates of each character in the original picture, so that a user can perform selection character by character.

For example, a user detects a picture by using a lens of a mobile phone, and manually selects a recognized word on a screen of the mobile phone that is presented in real time. The user may turn on a camera of the mobile phone to control the lens to focus on a picture or an object. Because shaking may occur in a process of holding the mobile phone by the user, resulting in a possible shake of an image presented on a screen, the user may fix the image by tapping a position on the screen. At a moment when the user taps the screen, an image captured by the camera in real time, that is, an image presented on the screen at the moment, is an input picture that needs to be input to the OCR detection and recognition model.

Figure 5:
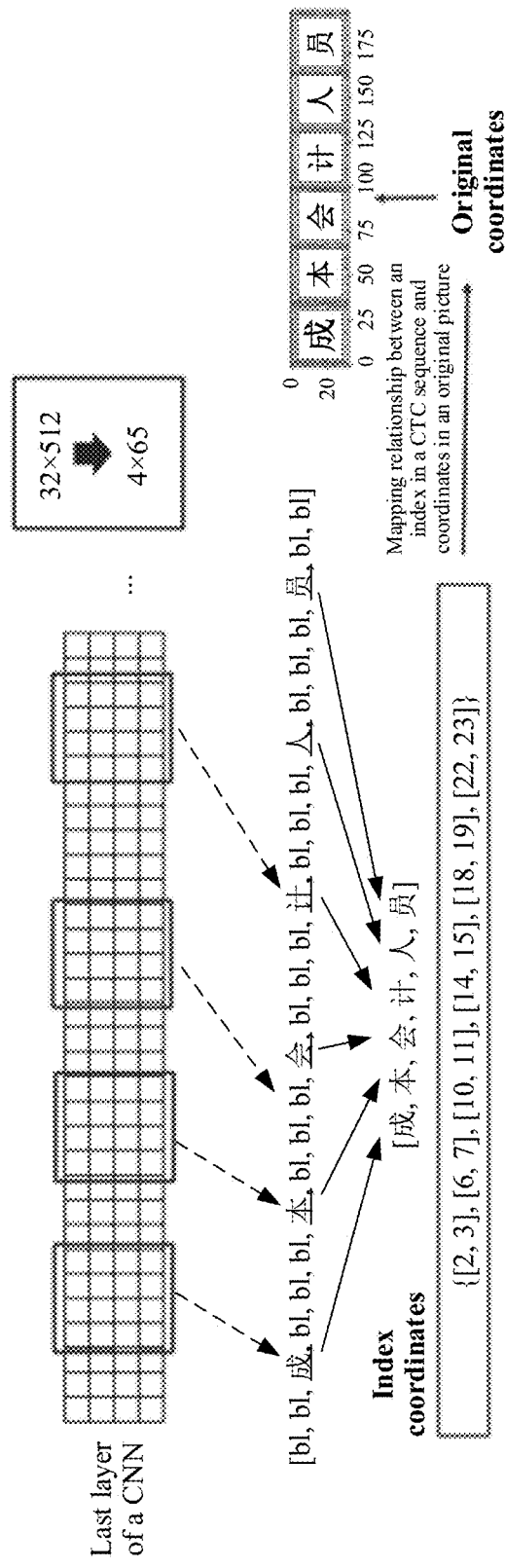
FIG. 5 is a schematic diagram of an overall processing process of a method for character selection based on character recognition according to an embodiment of this application.
Figure 6:
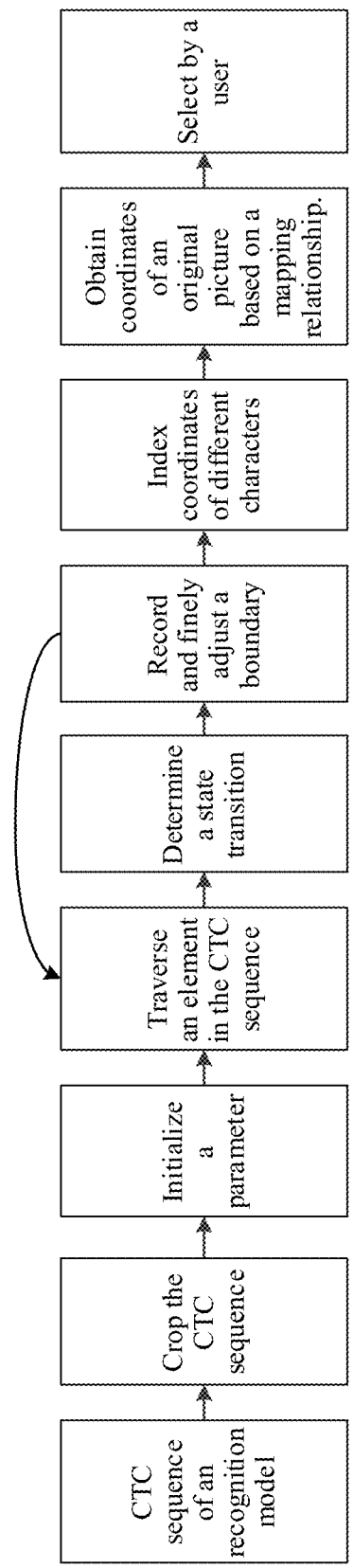
FIG. 6 is a schematic flowchart of an algorithm procedure of a method for character selection based on character recognition according to an embodiment of this application.

FIG. 5 and FIG. 6 are respectively a schematic diagram of an overall processing process and a schematic flowchart of an algorithm procedure of a method for character selection based on character recognition according to an embodiment of this application. For the input picture, the OCR detection and recognition model may automatically detect a text area in the picture, and use the CNN network as a network structure of the OCR detection and recognition model, and may directly perform a sliding window on a feature map of a last layer of the CNN after 8-time downsampling, to output a CTC sequence of the detection and recognition model. After the character selection model crops the sequence, a CTC sequence that meets a subsequent processing requirement, that is, a sequence [bl, bl, 成, bl, bl, bl, 本, bl, bl, bl, 会, bl, bl, bl, 计, bl, bl, bl, 人, bl, bl, bl, 员, bl, bl] in FIG. 5, may be obtained.

According to the algorithm procedure shown in FIG. 6, the character selection model may calculate index coordinates of different characters for the CTC sequence in FIG. 5, that is, index coordinates of each character of "成本会计人员" in the CTC sequence, that is, {[2, 3], [6, 7], [10, 11], [14, 15], [18, 19], [22, 23]}. The index coordinates are mapped back to the original picture, that is, the input picture of the OCR detection and recognition model, to obtain coordinates of each character of "成本会计人员" in the original picture, that is, left and right boundaries of each character. The user may select a word on the screen based on the coordinates output by the character selection model.

Because the character selection model has calculated the left and right boundaries of each character in the original picture, with reference to a fixed height of the to-be-recognized picture, the character selection model may obtain coordinates of four vertexes of each character in the original picture. When the user selects a recognized character on the screen, the character selection model may first traverse each line of recognized characters, draw a highlighted background, for example, a light-colored highlighted background, based on vertex coordinates of each line of characters, to notify the user of a currently recognized word range.

On the other hand, the character selection model may listen to a tap event of the user on the screen of the mobile phone. When it is detected through listening that the user taps a character area, a position of a current tapped line may be calculated, so that the entire tapped line of words may be set to a selected state, and a dark-colored highlighted background may be drawn for the line of words. In addition, draggable handles may be displayed at the head and tail of the line of words, and the user may modify a selected word range by dragging a handle.

If the user drags one of the handles, the character selection model may obtain a tap position of the user from a tap event generated by the user dragging the handle, and use a character closest to the position as a currently selected character. After the foregoing operations are repeated based on handle dragging of the user, a word area finally selected by the user may be obtained, and a dark-colored background may be drawn.

After the user stops the handle dragging, for example, there may be a wait of one second, and if no tap event of the user is detected through listening, it may be considered that a word currently selected by the user meets expectation. The character selection model may display a word card on the screen of the mobile phone, and present the word selected by the user. In addition, other operation buttons may be further provided on the word card. For the presented word, the user may tap different buttons to indicate applications corresponding to the buttons to perform corresponding operations based on the presented word, for example, translate or search for the presented word.

The following describes the method for character selection based on character recognition in this application with reference to embodiments.

The method for character selection based on character recognition that is provided in the embodiments of this application may be applied to a terminal device such as a mobile phone, a tablet computer, a wearable device, an in-vehicle device, an augmented reality (augmented reality, AR)/virtual reality (VR) device, a notebook computer, an ultra-mobile personal computer (UMPC), a netbook, or a personal digital assistant (PDA). A type of the terminal device is not limited in the embodiments of this application.

Figure 7:
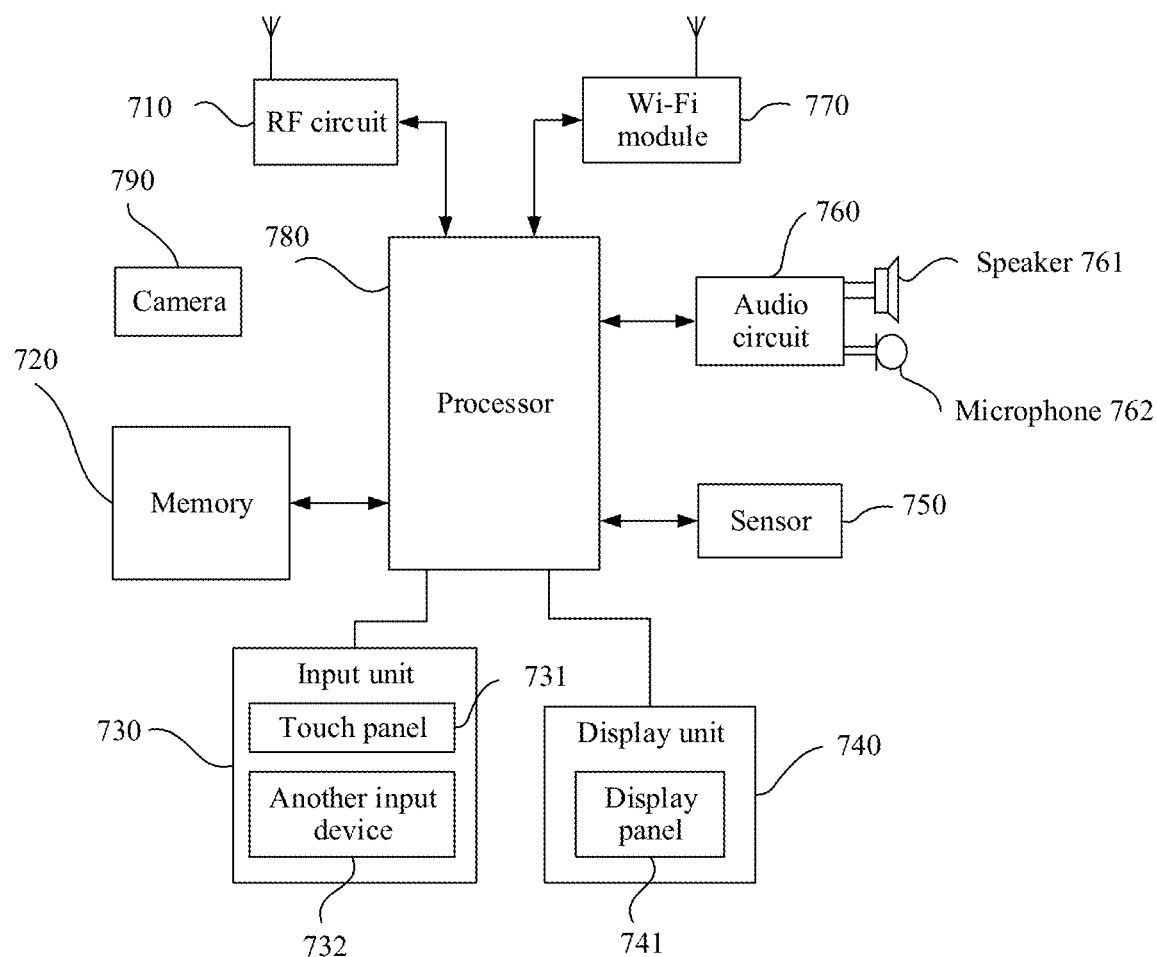
FIG. 7 is a schematic diagram of a hardware structure of a mobile phone to which a method for character selection based on character recognition according to an embodiment of this application is applicable.

For example, the terminal device is a mobile phone. FIG. 7 is a block diagram of a partial structure of a mobile phone according to an embodiment of this application. Refer to FIG. 7. The mobile phone includes components such as a radio frequency (RF) circuit 710, a memory 720, an input unit 730, a display unit 740, a sensor 750, an audio circuit 760, a wireless fidelity (Wi-Fi) module 770, a processor 780, and a power supply 790. One of ordinary skilled in the art may understand that the structure of the mobile phone shown in FIG. 7 does not constitute a limitation on the mobile phone, which may include more or fewer components than those shown in the figure, or have some components combined, or have a different component arrangement.

The following describes the components of the mobile phone with reference to FIG. 7.

The RF circuit 710 may be configured to receive and send signals in information receiving and sending processes or call processes. Particularly, the RF circuit receives downlink information from a base station, then delivers the downlink information to the processor 780 for processing, and sends related uplink data to the base station. Usually, an RF circuit includes but is not limited to an antenna, at least one amplifier, a transceiver, a coupler, a low noise amplifier (LNA), a duplexer, and the like. In addition, the RF circuit 710 may further communicate with a network and another device through wireless communication. The wireless communication may use any communication standard or protocol, including but not limited to, a global system for mobile communications (GSM), a general packet radio service (GPRS), code division multiple access (CDMA), wideband code division multiple access (WCDMA), long term evolution (LTE), an email, and a short message service (SMS), and the like.

The memory 720 may be configured to store a software program and module. The processor 780 runs the software program and module stored in the memory 720, to perform various functional applications and data processing of the mobile phone. The memory 720 may mainly include a program storage area and a data storage area. The program storage area may store an operating system, an application program required by at least one function (such as a sound playing function and an image playing function), and the like. The data storage area may store data (such as audio data and an address book) created based on use of the mobile phone. In addition, the memory 720 may include a high-speed random access memory, and may further include a non-volatile memory, for example, at least one disk storage component, a flash component, or another volatile solid-state storage component.

The input unit 730 may be configured to receive input digit or character information, and generate key signal inputs related to a user setting and function control of the mobile phone 700. The input unit 730 may include a touch panel 731 and another input device 732. The touch panel 731, also referred to as a touchscreen, may collect a touch operation of a user on or near the touch panel 731 (such as an operation performed by the user on or near the touch panel 731 by using any suitable object or accessory such as a finger or a stylus), and drive a corresponding connected apparatus based on a preset program. In an embodiment, the touch panel 731 may include two parts: a touch detection apparatus and a touch controller. The touch detection apparatus detects a touch orientation of the user, detects a signal generated by the touch operation, and transfers the signal to the touch controller. The touch controller receives touch information from the touch detection apparatus, converts the touch information into contact coordinates, and sends the contact coordinates to the processor 780. Moreover, the touch controller can receive and execute a command sent from the processor 780. In addition, the touch panel 731 may be implemented by using a plurality of types such as a resistive type, a capacitive type, an infrared ray, and a surface acoustic wave. In addition to the touch panel 731, the input unit 730 may further include the another input device 732. The another input device 732 may include but is not limited to one or more of a physical keyboard, a functional button (for example, a volume control button or a power button), a trackball, a mouse, a joystick, and the like.

The display unit 740 may be configured to display information input by the user or information provided for the user, and various menus of the mobile phone. The display unit 740 may include a display panel 741. In an embodiment, the display panel 741 may be configured in a form of a liquid crystal display (LCD), an organic light-emitting diode (OLED), or the like. Further, the touch panel 731 may cover the display panel 741. After detecting a touch operation on or near the touch panel 731, the touch panel transfers the touch operation to the processor 780 to determine a type of a touch event. Subsequently, the processor 780 provides a corresponding visual output on the display panel 741 based on the type of the touch event. Although in FIG. 7, the touch panel 731 and the display panel 741 are used as two separate parts to implement input and output functions of the mobile phone, in some embodiments, the touch panel 731 and the display panel 741 may be integrated to implement the input and output functions of the mobile phone.

The mobile phone 700 may further include at least one type of sensor 750, for example, a light sensor, a motion sensor, or another sensor. The light sensor may include an ambient light sensor and a proximity sensor. The ambient light sensor may adjust luminance of the display panel 741 based on brightness of ambient light. The proximity sensor may switch off the display panel 741 and/or backlight when the mobile phone is moved to an ear. As one type of the motion sensor, an accelerometer sensor may detect values of accelerations in various directions (generally on three axes). The accelerometer sensor may detect a value and a direction of gravity when the accelerometer sensor is still, and may be used in an application for recognizing a mobile phone posture (for example, switching between a landscape screen and a vertical screen, a related game, or magnetometer posture calibration), a function related to vibration recognition (for example, a pedometer or a knock), and the like. Other sensors such as a gyro, a barometer, a hygrometer, a thermometer, and an infrared sensor may be further configured in the mobile phone. Details are not described herein.

The audio circuit 760, a speaker 761, and a microphone 762 may provide audio interfaces between the user and the mobile phone. The audio circuit 760 may convert received audio data into an electrical signal and transmit the electrical signal to the speaker 761. The speaker 761 converts the electrical signal into a sound signal for output. On the other hand, the microphone 762 converts a collected sound signal into an electrical signal. The audio circuit 760 receives the electrical signal and then converts the electrical signal into audio data, and then outputs the audio data to the processor 780 for processing. Then, the processor sends the audio data to, for example, another mobile phone by using the RF circuit 710, or outputs the audio data to the memory 720 for further processing.

Wi-Fi belongs to a short-range wireless transmission technology. Using the Wi-Fi module 770, the mobile phone can help the user receive or send an e-mail, browse a web page, access streaming media, and the like, which provides wireless broadband Internet access for the user. Although FIG. 7 shows the Wi-Fi module 770, it may be understood that the Wi-Fi module is not a necessary component of the mobile phone 700, and when required, the Wi-Fi module may be certainly omitted provided that the scope of the essence of the present disclosure is not changed.

The processor 780 is a control center of the mobile phone, and is connected to various parts of the mobile phone by using various interfaces and lines. By running or executing the software program and/or module stored in the memory 720, and invoking data stored in the memory 720, the processor performs various functions and data processing of the mobile phone, to perform overall monitoring on the mobile phone. In an embodiment, the processor 780 may include one or more processing units. Preferably, the processor 780 may integrate an application processor and a modem processor. The application processor mainly processes an operating system, a user interface, an application, and the like. The modem processor mainly processes wireless communication. It may be understood that the modem processor may alternatively not be integrated into the processor 780.

The mobile phone 700 further includes the camera 790. In an embodiment, with respect to a position on the mobile phone 700, the camera 790 may be front-facing or rear-facing. This is not limited in an embodiment of the application.

In an embodiment, the mobile phone 700 may include a single camera, two cameras, three cameras, or the like. This is not limited in an embodiment of the application.

For example, the mobile phone 700 may include three cameras, including a main camera, a wide-angle camera, and a long-focus camera.

In an embodiment, when the mobile phone 700 includes a plurality of cameras, the plurality of cameras may be all front-facing or rear-facing, or some are front-facing and others are rear-facing. This is not limited in an embodiment of the application.

Although not shown, the mobile phone 700 further includes a power supply (such as a battery) for supplying power to the components. Preferably, the power supply may be logically connected to the processor 780 by using a power management system, to implement functions such as charging, discharging and power consumption management by using the power management system.

In addition, although not shown, the mobile phone 700 may further include a Bluetooth module or the like. Details are not described herein.

Figure 8:
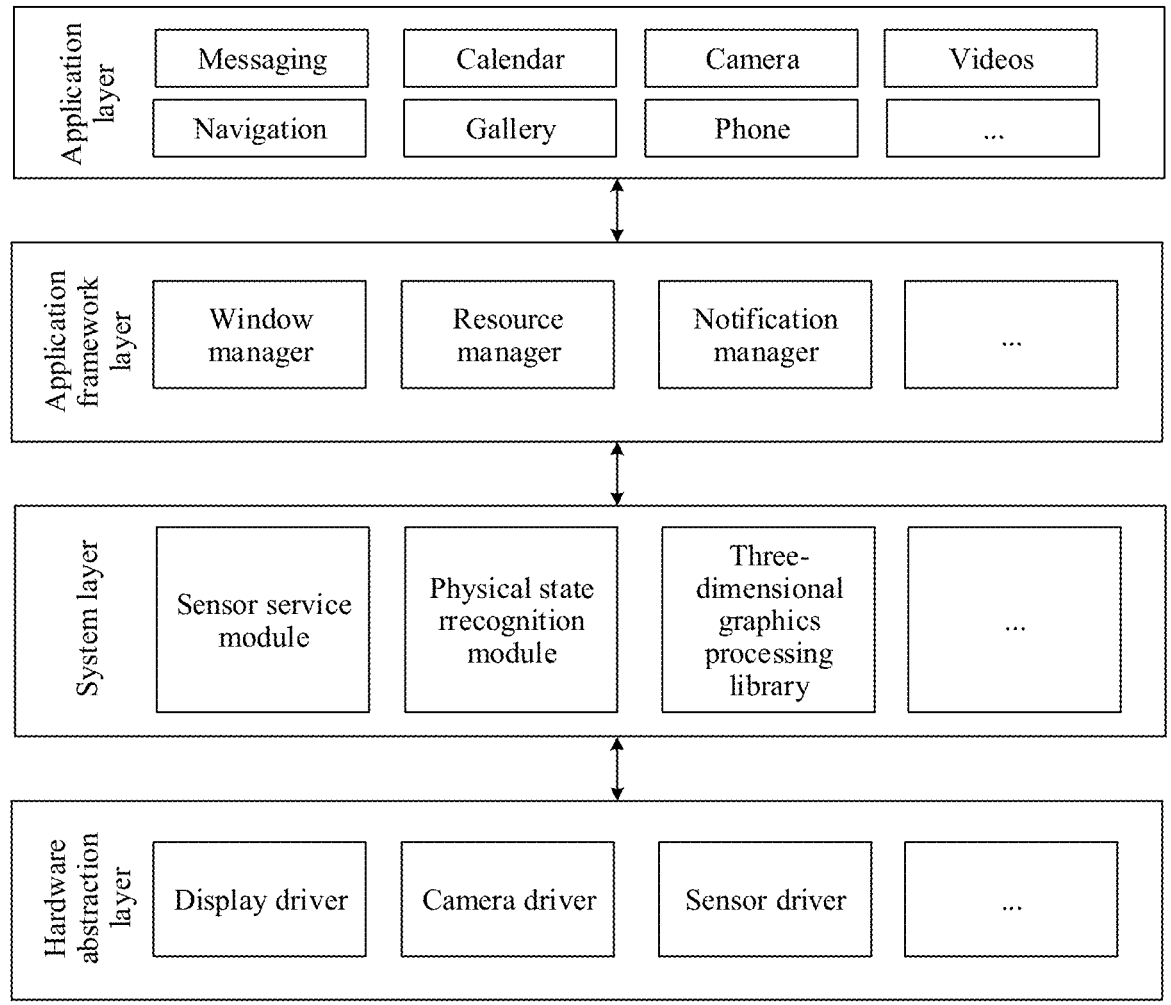
FIG. 8 is a schematic diagram of a software structure of a mobile phone to which a method for character selection based on character recognition according to an embodiment of this application is applicable.

FIG. 8 is a schematic diagram of a software structure of the mobile phone 700 according to an embodiment of this application. For example, the operating system of the mobile phone 700 is an Android system. In some embodiments, the Android system is divided into four layers: an application layer, an application framework layer (FWK), a system layer, and a hardware abstraction layer. The layers communicate with each other through a software interface.

As shown in FIG. 8, the application layer may include a series of application packages, and the application packages may include applications such as SMS, calendar, camera, video, navigation, gallery, and call.

The application framework layer provides an application programming interface (API) and a programming framework for an application at the application layer. The application framework layer may include some predefined functions, such as a function for receiving an event sent by the application framework layer.

As shown in FIG. 8, the application framework layer may include a window manager, a resource manager, a notification manager, and the like.

The window manager is configured to manage a window program. The window manager may obtain a size of a display, determine whether there is a status bar, perform screen locking, take a screenshot, and the like. A content provider is configured to store and obtain data, and enable the data to be accessed by an application. The data may include a video, an image, audio, calls that are made and answered, a browsing history, a bookmark, a phone book, and the like.

The resource manager provides an application with various resources such as a localized character string, an icon, a picture, a layout file, and a video file.

The notification manager enables an application to display notification information in the status bar, and may be configured to transmit a notification message. The displayed notification information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running in the background or a notification that appears on a screen in a form of a dialog window. For example, text information is displayed in the status bar, an announcement is given, the electronic device vibrates, or the indicator light blinks.

The application framework layer may further include:

a view system, the view system includes visual controls, such as a text display control and a picture display control. The view system may be used to construct an application. A display interface may include one or more views. For example, a display interface including an SMS message notification icon may include a text display view and a picture display view.

The phone manager is configured to provide a communication function of the mobile phone 700, for example, management of a call status (including answering, declining, or the like).

The system layer may include a plurality of function modules, for example, a sensor service module, a physical state recognition module, and a three-dimensional graphics processing library (such as OpenGL ES).

The sensor service module is configured to monitor sensor data uploaded by various types of sensors at a hardware layer, and determine a physical state of the mobile phone 700.

The physical state recognition module is configured to analyze and recognize a user gesture, a human face, or the like.

The three-dimensional graphics processing library is configured to implement three-dimensional graphics drawing, image rendering, composition, layer processing, and the like.

The system layer may further include:

a surface manager, configured to manage a display subsystem and provide fusion of 2D and 3D layers for a plurality of applications.

A media library supports playback and recording in a plurality of frequently used audio and video formats, a static image file, and the like. The media library may support a plurality of audio and video coding formats, for example, MPEG-4, H.264, MP3, AAC, AMR, JPG, and PNG.

The hardware abstraction layer is a layer between hardware and software. The hardware abstraction layer may include a display driver, a camera driver, a sensor driver, or the like, to drive related hardware such as the display screen, the camera, or the sensor at the hardware layer.

The following embodiment may be implemented on the mobile phone 700 having the foregoing hardware structure/ software structure. In the following embodiment, the mobile phone 700 is used as an example to describe the method for character selection based on character recognition that is provided in the embodiments of this application.

Figure 9:
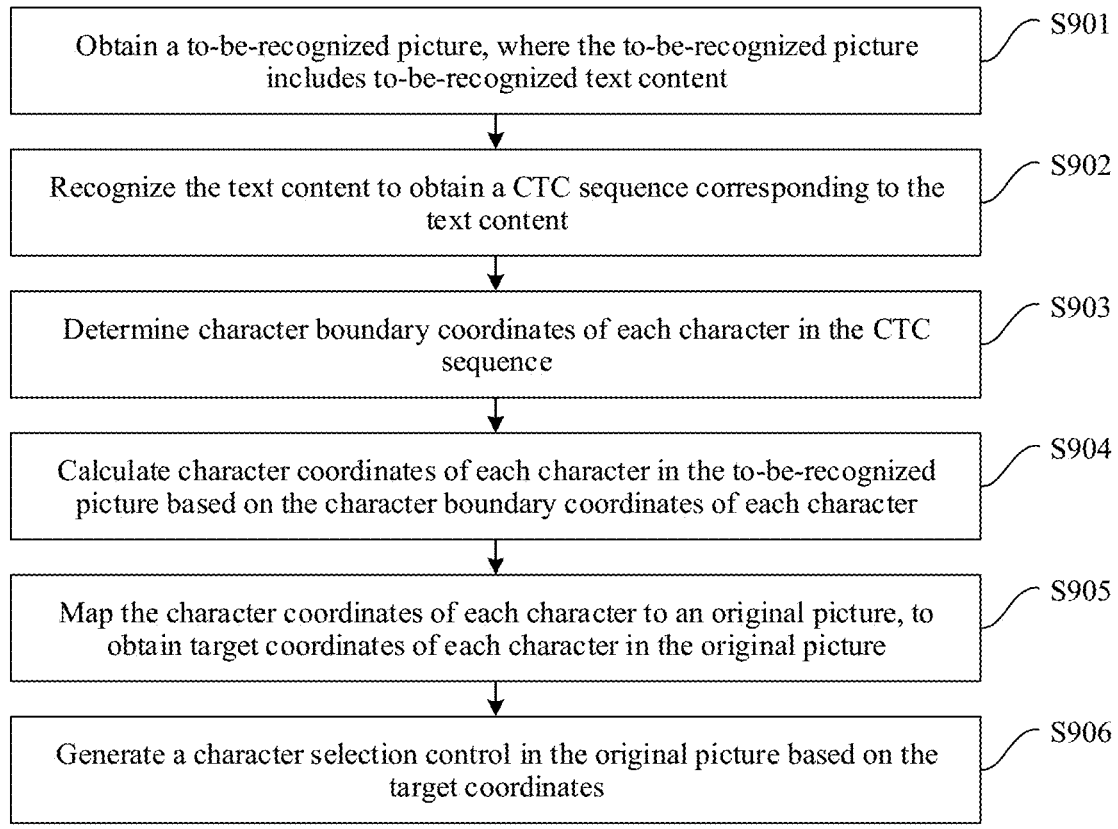
FIG. 9 is a schematic operation flowchart of a method for character selection based on character recognition according to an embodiment of this application.

FIG. 9 is a schematic operation flowchart of a method for character selection based on character recognition according to an embodiment of this application. As an example instead of a limitation, the method may be applied to the mobile phone 700, and the method may include the following operations.

S901. Obtain a to-be-recognized picture, where the to-be-recognized picture includes to-be-recognized text content.

It should be noted that, in an embodiment, the method for character selection in an embodiment of the application is described from a perspective of processing a CTC sequence obtained by an OCR detection and recognition model, to present prompt information on a screen for manual selection by a user. That is, an embodiment describes a process in FIG. 4 in which the character selection model receives the input CTC sequence and processes the input CTC sequence.

In an embodiment of the application, the to-be-recognized picture may be obtained by detecting an original picture. The original picture may be an image presented on the screen of the mobile phone in real time after the user turns on the camera of the mobile phone, and the image includes the to-be-recognized text content.

S902. Recognize the text content to obtain a CTC sequence corresponding to the text content.

In an embodiment of the application, the CTC sequence corresponding to the text content may be a sequence obtained after preliminary processing is performed on the input CTC sequence. The CTC sequence is an intermediate output result of the OCR detection and recognition model. After the CTC sequence is output from the detection and recognition model, a final recognition result may be obtained by parsing the CTC sequence by using a rule. Any CTC sequence may include a plurality of CTC sequence elements, that is, an element obtained after a to-be-recognized sequence passes through each sliding window of a last layer of a CNN. The element may be a character of the to-be-recognized sequence or blank. A value of the element may be a recognized character or an index of the character.

The preliminary processing in an embodiment may include processing processes such as cropping and parameter initialization on the input CTC sequence.

In an embodiment, the input CTC sequence may be cropped based on a CNN downsampling rate in a subsequent processing process, so that a product of a cropped CTC sequence and the downsampling rate is not greater than a picture width of the to-be-recognized picture. The cropping may be performed in an order that a character at the head of the input CTC sequence is cropped first, then a character at the tail is cropped, and then a character at the head is cropped. Certainly, the cropping may alternatively be performed in an order that the tail is cropped first, then the head is cropped, and then the tail is cropped. This is not limited in an embodiment.

Each time a character is cropped, a calculation may be performed to determine whether a product of a remaining CTC sequence length and the CNN downsampling rate is less than or equal to the picture width of the to-be-recognized picture. If the product is less than or equal to the picture width of the to-be-recognized picture, the cropping is stopped and a next operation is performed. Otherwise, a next character continues to be cropped based on the foregoing operations.

For example, it is assumed that the input CTC sequence in the to-be-recognized picture is:

[bl, bl, bl, 成, bl, bl, bl, 本, bl, bl, bl, 会, bl, bl, bl, 计, bl, bl, bl, 人, bl, bl, bl, 员, bl, bl], where bl is a blank character (blank), and a size of the to-be-recognized picture is 32*199 (height*width) pixels.

1. For the cropping on the input CTC sequence, (a) a rule is that a CTC sequence length (26) multiplied by the CNN downsampling rate (8) is not greater than the picture width (199);

(b) operations are cropping in the order that the head is cropped first, then the tail is cropped, and then the head is cropped; and (c) if any one of the foregoing operations meets a condition in (a), a current CTC sequence is returned.

For the input CTC sequence in the example, the following cropping process may be obtained:

[bl, bl, bl, 成, bl, bl, bl, 本, bl, bl, bl, 会, bl, bl, bl, 计, bl, bl, bl, 人, bl, bl, bl, 员, bl, bl]

(head cropping)

[bl, bl, 成, bl, bl, bl, 本, bl, bl, bl, 会, bl, bl, bl, 计, bl, bl, bl, 人, bl, bl, bl, 员, bl, bl]

(tail cropping)

[bl, bl, 成, bl, bl, bl, 本, bl, bl, bl, 会, bl, bl, bl, 计, bl, bl, bl, 人, bl, bl, bl, 员, bl]

After the head and tail cropping, the condition is met (Remaining sequence length 24*Downsampling rate 8=192<Picture width 199), and the current CTC sequence is returned.

The parameter initialization on the cropped CTC sequence may include:

(a) initializing a left boundary (−1), a right boundary (−1), a current state (0), and a previous state (blank); and (b) initializing a coordinate array and a content array, whose initial values are both null.

A character boundary may include a left boundary and a right boundary, that is, positions on a left end and a right end of each element or character in the CTC sequence. The character boundary may be classified as a boundary in the CTC sequence and a boundary in the original picture. In this operation, the boundary in the CTC sequence needs to be initialized.

The current state may refer to a type of each element, for example, a number, Chinese, Japanese, Korean, or English.

The coordinate array may be an array that stores index coordinates of all the characters. The content array is an array that stores content of each character or word content. During initialization, the coordinate array and the content array may be both set to null.

S903. Determine character boundary coordinates of each character in the CTC sequence.

In an embodiment of the application, each element in the CTC sequence may be traversed to obtain a left character boundary and a right character boundary of the element.

For example, for the following CTC sequence:

[bl, bl, 成, bl, bl, bl, 本, bl, bl, bl, 会, bl, bl, bl, 计, bl, bl, bl, 人, bl, bl, bl, 员, bl], first, the first character "成" may be processed, a right boundary of the character and a left boundary of a next character "本" may be recorded, and after all characters are processed in the foregoing manner, each different character and its corresponding array index range are obtained.

After the left and right boundaries of the character or word are preliminarily determined, because CTC sequences output for different languages are processed differently by the detection and recognition model, the left and right boundaries may need to be finely adjusted for different languages. Therefore, in an embodiment of the application, boundaries of different types of characters may be further finely adjusted based on a rule.

The character boundary may be finely adjusted based on the following operations:

(a) first, calculating an average of coordinates of left and right boundaries of adjacent characters; and (b) calculating the average minus or plus a offset to obtain new left and right boundaries of the characters.

In an embodiment, for two adjacent characters, first, based on a coordinate of a right boundary of a character in the front and a coordinate of a left boundary of a character behind, an average of the coordinates of the left and right boundaries may be calculated. For example, in the CTC sequence in the foregoing example, for adjacent characters "成" and "本", based on a coordinate of a right boundary of the character "成" and a coordinate of a left boundary of the character "本", a coordinate average of the two may be calculated.

Then, an offset may be subtracted from or added to the coordinate average, to obtain new left and right boundaries of the characters. For the character in the front of the two adjacent characters, the offset may be subtracted from the calculated coordinate average to obtain a new right boundary coordinate of the character in the front. For the character behind, the offset may be added to the coordinate average to obtain a new left boundary coordinate of the character behind.

In an embodiment of the application, offsets of characters of different languages or types may be determined based on the following rule:

For Chinese, Japanese, or Korean, an offset may be ⅛. For a western language (Latin), an offset may be ½. For numbers, an offset may also be ½.

Therefore, after the left and right boundaries of each character are finely adjusted based on a language, the following coordinate result may be obtained for the CTC sequence in the foregoing example:

[(1.0, 4.375), (4.625, 8.375), (8.625, 12.375), (12.625, 16.375), (16.625, 20.375), (20.625, 23)].

The coordinate result is coordinates of the six characters "成本会计人员" in the CTC sequence.

S904. Calculate character coordinates of each character in the to-be-recognized picture based on the character boundary coordinates of each character.

Generally, OCR recognition uses an input of a size of 32*512 pixels, a size of an output feature map is 4*65 pixels, and a downsampling rate is 8. Finally, a convolution kernel of 4*4 pixels is used for a sliding window during recognition. That is, one element in the CTC sequence corresponds to a range covered by eight pixel widths of the original picture.

Therefore, in an embodiment of the application, the character boundaries of each character that are calculated in the previous operation may be multiplied by the CNN downsampling rate, to obtain the coordinates of each character in the to-be-recognized picture.

For example, for the following coordinate result:

[(1.0, 4.375), (4.625, 8.375), (8.625, 12.375), (12.625, 16.375), (16.625, 20.375), (20.625, 23)], after the left and right boundary coordinates of each character are multiplied by the downsampling rate 8, coordinates of each character in the to-be-recognized picture may be obtained, and units of the coordinates are (one) pixel:

[(8, 35.0), (37.0, 67.0), (69.0, 99.0), (101.0, 131.0), (133.0, 163.0), (165.0, 184)].

Generally, if presentation is performed based on the coordinates, some pixels of head and tail characters of each line of sequence may be beyond pixels corresponding to the coordinates. For example, if the head character "成" is presented based on a left boundary coordinate 8, some pixels of the character may be on the left of the coordinate 8. Similarly, if the tail character "员" is presented based on a right boundary coordinate 184, some pixels of the character may be on the right of the coordinate 184.

Therefore, to ensure that a final area corresponding to the coordinates obtained through mapping can completely cover a pixel of each character, coordinates of the head character and the tail character may be further finely adjusted.

In an embodiment, a left boundary coordinate of the head character in the to-be-recognized picture and a right boundary coordinate of the tail character in the to-be-recognized picture may be finely adjusted. Final coordinates of the left and right boundaries of each character in the to-be-recognized picture that are obtained after the coordinates of the head and tail characters are finely adjusted may be:

[(2, 35.0), (37.0, 67.0), (69.0, 99.0), (101.0, 131.0), (133.0, 163.0), (165.0, 197)].

That is, a value is subtracted from the left boundary coordinate of the head character, and a value is added to the right boundary coordinate of the tail character. The subtracted and added values may be the same or different. This is not limited in an embodiment.

The obtained coordinates are merely the left and right boundary coordinates of each character in the to-be-recognized picture. Therefore, in a subsequent processing process, coordinates of four vertexes of each character, that is, coordinates of an upper left vertex, a lower left vertex, an upper right vertex, and a lower right vertex of each character, may be obtained with reference to the height of the to-be-recognized picture.

Because OCR recognition uses input data of a fixed size of 32*512 pixels, a height of OCR recognition may be fixed to 32 pixels. Therefore, coordinates of four vertexes of the head character "成" in the foregoing example may be represented as [(2, 32), (2, 0), (35.0, 0), (35.0, 32)].

Figure 10:
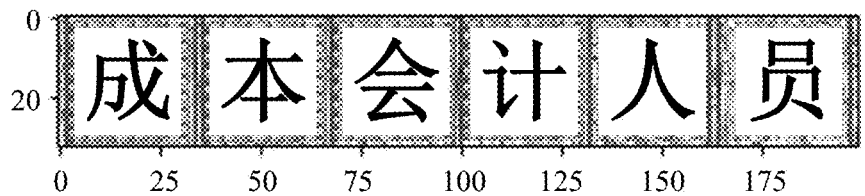
FIG. 10 is a schematic diagram of a presentation effect of coordinates of each character in a to-be-recognized picture according to an embodiment of this application.

FIG. 10 shows a presentation effect of coordinates of each character in a to-be-recognized picture according to an embodiment of this application.

S905. Map the character coordinates of each character to the original picture, to obtain target coordinates of each character in the original picture.

In an embodiment of the application, for the character coordinates of each character in the to-be-recognized picture, the coordinates of the four vertexes of each character in the to-be-recognized picture may be multiplied by a perspective transformation matrix, to obtain the target coordinates of each character in the original picture. The original picture may be a picture captured on the screen in real time by using the camera of the mobile phone at a moment when a screen image is fixed when the user attempts to perform a word selection operation and photographs an object or a picture by using a lens of the mobile phone.

It should be noted that, when the OCR detection and recognition model is used for text detection and recognition, each text area is not in a completely standard font, and may be italic. Therefore, in an OCR detection and recognition process, the italic text may be automatically changed. The perspective transformation matrix is obtained in the process.

When the coordinates of each character are mapped to the original picture, the perspective transformation matrix calculated in the OCR detection and recognition process may be directly invoked to calculate the target coordinates of each character in the original picture.

S906. Generate a character selection control in the original picture based on the target coordinates.

In an embodiment of the application, for target coordinates of each character in each recognized text area in the original picture, a character selection control may be generated in the original picture based on the target coordinates. The character selection control may be drawing a highlighted background for a character line in each text area, to notify the user of a currently recognized word range.

On the other hand, a tap event of the user on the screen of the mobile phone, that is, on the original picture presented by using the screen of the mobile phone, may be listened to.

When it is detected through listening that the user taps a character area, a position of a current tapped line may be calculated, so that the entire tapped line of words may be set to a selected state, and a dark-colored highlighted background may be drawn for the line of words. In addition, draggable handles may be displayed at the head and tail of the line of words, and the user may modify a selected word range by dragging a handle.

Figure 11A:
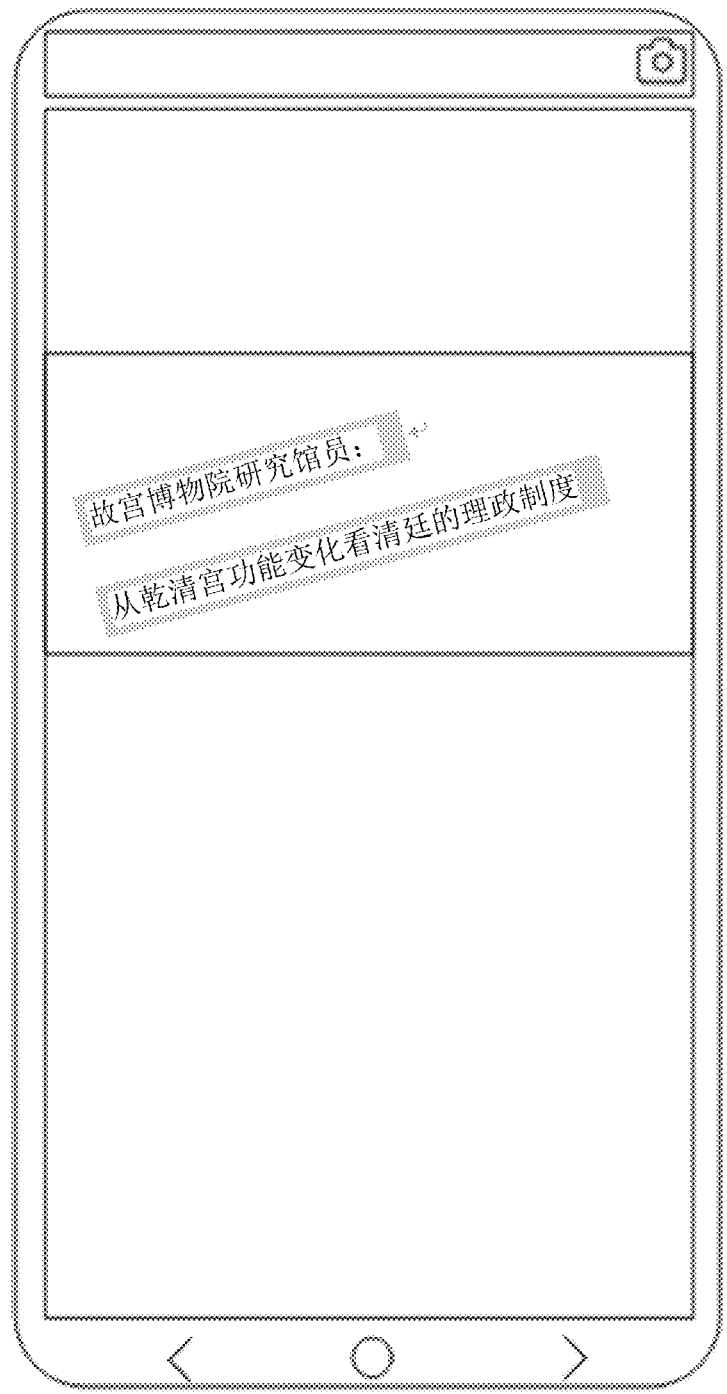
FIG. 11(a) and FIG. 11(b) are schematic diagrams of a character selection control according to an embodiment of this application.
Figure 11B:
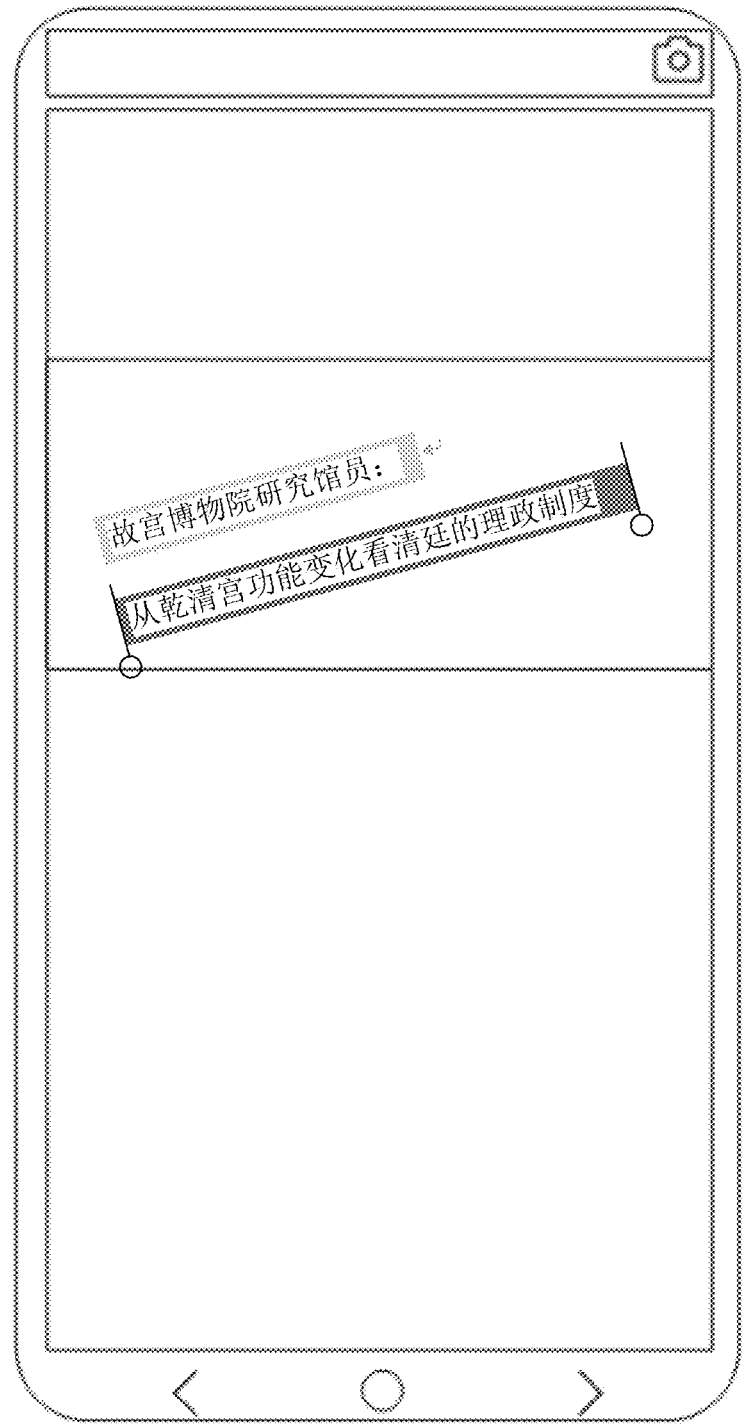

FIG. 11(a) and FIG. 11(b) are schematic diagrams of a character selection control according to an embodiment of this application. For the recognized word range, background of each line of characters may be drawn in a color shown in FIG. 11(a) in character lines. When a tap event of the user within a character range of a line is detected through listening, as shown in FIG. 11(b), draggable handles may be drawn at the head and tail of the tapped line of characters, and the line of characters is drawn in another color different from that of FIG. 11(a), to notify the user that a character in the current line may be selected.

In an embodiment of the application, a mapping relationship between an index in a CTC sequence output by an OCR detection and recognition model and coordinates in an original picture is established based on a characteristic of CNN downsampling (eight times) by using an existing CNN structure in the OCR detection and recognition model. The model used in the entire process is simple and an amount of data that needs to be labeled is small. During processing, a picture detected or captured in real time may be used, and a calculation speed is about 60 times faster than an algorithm used in another selection solution in which an entire picture is traversed. This may be directly adapted and deployed to an existing OCR model. Second, in an embodiment of the application, when a character boundary is determined, the character boundary may be finely adjusted by setting a hyperparameter based on different languages, to ensure accuracy of character boundary recognition, which not only is applicable to most languages, but also supports symbol selection. Third, in an embodiment of the application, boundary coordinates of each character are recorded and mapped to the original picture to obtain coordinates of each character in the original picture, so that a granularity of coordinate output is finer, and when a manual selection operation is performed, it is insensitive to ambiguity caused by segmentation between words and between a word and a symbol, and there is no problem that characters cannot be segmented, thereby achieving stronger universality in practical application. Fourth, thanks to robustness of the OCR detection and recognition model, the method for character selection that is provided in an embodiment of the application also has stronger robustness for character positioning in a natural scenario.

Figure 12:
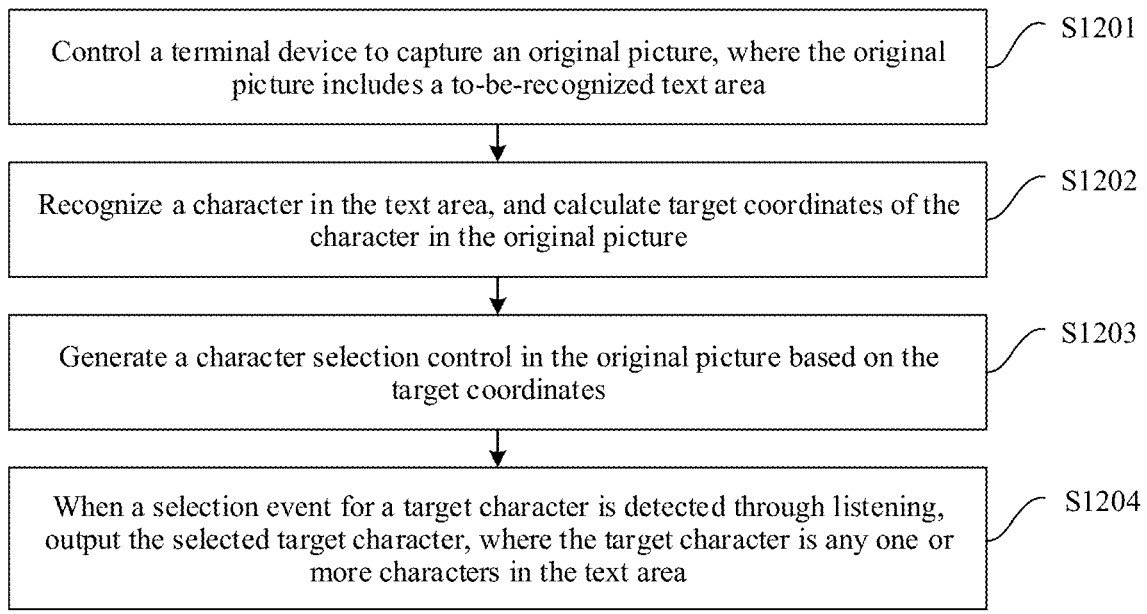
FIG. 12 is a schematic operation flowchart of a method for character selection based on character recognition according to another embodiment of this application.

FIG. 12 is a schematic operation flowchart of a method for character selection based on character recognition according to another embodiment of this application. The method may include the following operations.

S1201. Control a terminal device to capture an original picture, where the original picture includes a to-be-recognized text area.

It should be noted that an embodiment describes the method for character selection in an embodiment of the application from a perspective of interaction between a user and a mobile phone. That is, an embodiment describes an interaction process between the user and a screen of the mobile phone when the user performs a word selection operation by using a lens of the mobile phone.

The terminal device in an embodiment may be a device such as a mobile phone, a tablet computer, or a smart lens. A type of the terminal device is not limited in an embodiment.

For example, the terminal device is a mobile phone. The user may turn on a camera of the mobile phone to control the lens to focus on a picture or an object for photographing. Generally, because shaking may occur in a process of holding the mobile phone by the user, resulting in a possible shake of an image presented on the screen, the user may fix, that is, frame, the image by tapping a position on the screen. At a moment when the user taps the screen, an image captured by the camera in real time, that is, an image presented on the screen at the moment, is an original picture that needs to be input to an OCR detection and recognition model. The original picture includes a to-be-recognized text area. The text area may be one or more lines, and each line of text areas may include characters or symbols of different types. This is not limited in an embodiment.

S1202. Recognize a character in the text area, and calculate target coordinates of the character in the original picture.

In an embodiment of the application, for the original picture obtained through framing, the OCR detection and recognition model may automatically recognize each text area in the picture, and output a CTC sequence corresponding to each line of characters or symbols in each text area. The CTC sequence may be provided for processing by a character selection model, to obtain target coordinates of each character in the original picture.

Because a process of recognizing a character in the text area by using the OCR detection and recognition model to output a corresponding CTC sequence, then processing the CTC sequence by using the character selection model provided in an embodiment, calculating coordinates of each character in the CTC sequence, and mapping the coordinates to obtain target coordinates of each character in the original picture is similar to operations S901 to S905 in the foregoing embodiment, reference may be made to each other, and details are not described again in an embodiment.

S1203. Generate a character selection control in the original picture based on the target coordinates.

In an embodiment of the application, for target coordinates of each character in each recognized text area in the original picture, a character selection control may be generated in the original picture based on the target coordinates. The character selection control may be drawing a highlighted background for a character line in each text area, to notify the user of a currently recognized word range.

In an embodiment, for a character line corresponding to each CTC sequence, a highlighted background covering all characters in the entire line may be drawn based on obtained vertex coordinates of each character in the line, or a highlighted background covering the character line may be drawn based on vertex coordinates of head and tail characters of the line.

The character selection control is drawn based on the target coordinates of each character in the original picture, as shown in FIG. 11(a).

S1204. When a selection event for a target character is detected through listening, output the selected target character, where the target character is any one or more characters in the text area.

In an embodiment of the application, the selection event for the target character may be an event generated when the user taps a text area on the screen of the mobile phone on which the character selection control has been drawn, for example, a tap operation performed by the user in any text area with a highlighted background drawn in FIG. 11(a).

If the user taps the text area, a position of a current tapped line may be first calculated, then the entire tapped line of words is set to a selected state, and a dark-colored word background is drawn, as shown in FIG. 11(b). Certainly, for a tapped line of words, when a word background is drawn, a background color that needs to be drawn may be determined based on an actual requirement. This is not limited in an embodiment.

In addition, corresponding draggable handle symbols may be further generated at head and tail positions of the tapped and selected line of words, to prompt the user that a selected range may be modified by dragging the handles.

If the user taps and drags one of the handles, the selected word range may be re-determined based on a position of the handle dragged by the user.

For example, for the draggable handles initially at the head and tail positions, if the user drags a left handle, a position of the dragged left handle may be recognized, and a range between the dragged left handle and a right handle that is not dragged is used as a re-determined selected word range. That is, the selected word range is from a character on the right of the dragged left handle to a last character of the line.

Alternatively, if the user drags the right handle, a position of the dragged right handle may be recognized, and a range between the dragged right handle and the left handle that is not dragged is used as a re-determined selected word range. That is, the selected word range is from the first character of the line to a character on the left of the dragged right handle.

Certainly, the user may alternatively drag the left handle and the right handle sequentially. In this case, a re-determined word range is all characters between the first character on the right of a current position of the dragged left handle and the first character on the left of a current position of the dragged right handle.

The action of dragging the left or right handle by the user may be repeated until the user considers that a current word obtained through selection meets expectation. After the user completes selection, a word card may be displayed in an interface of the mobile phone to present word content selected by the user.

In an embodiment, whether the user completes the selection operation may be determined by a wait of a duration, for example, one second. If no further action of dragging a handle by the user is detected through listening, it may be considered that the user has completed the selection operation.

Figure 13A:
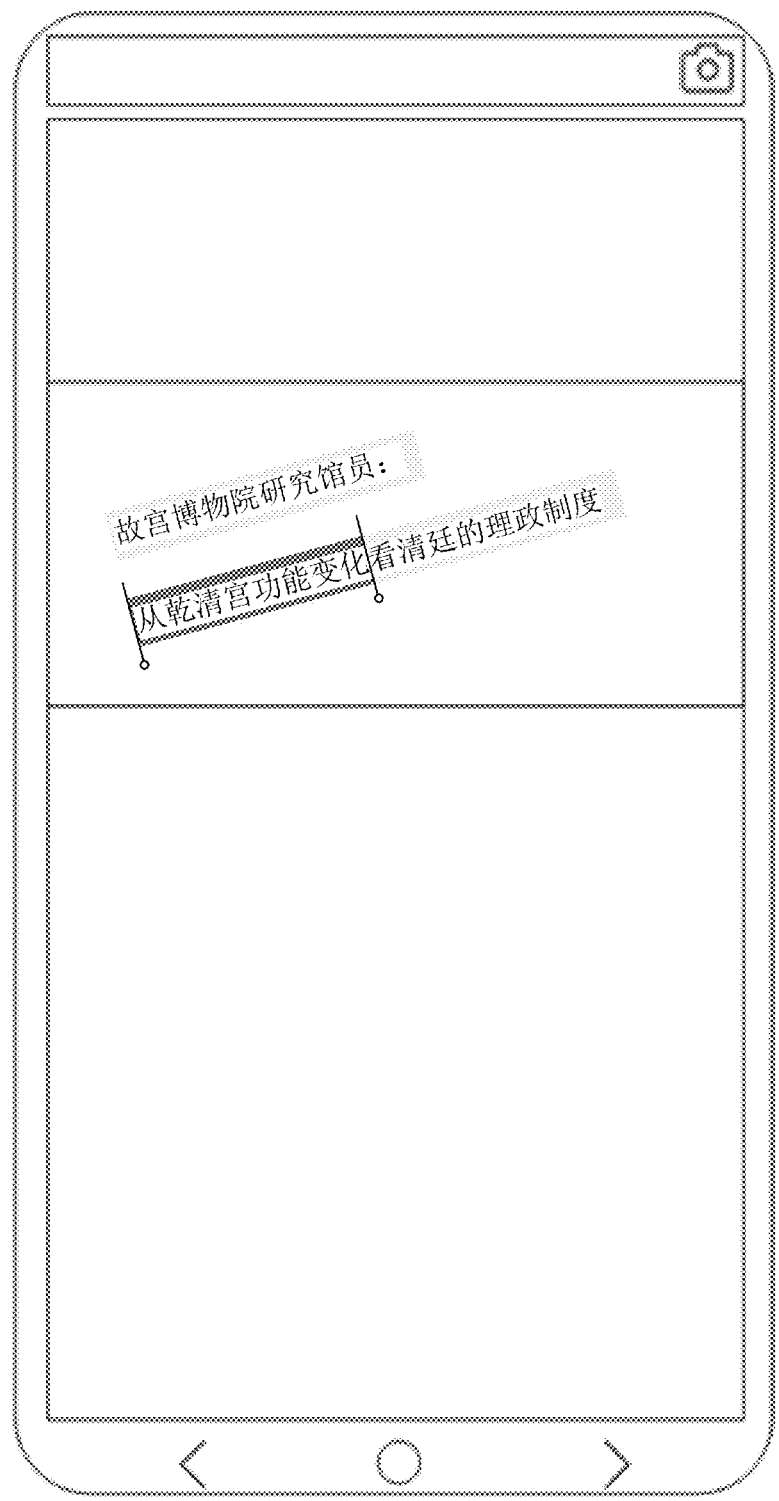
FIG. 13(a) to FIG. 13(c) are schematic diagrams presenting example effects when a character is selected by using the method for character selection based on character recognition according to an embodiment of this application.
Figure 13B:
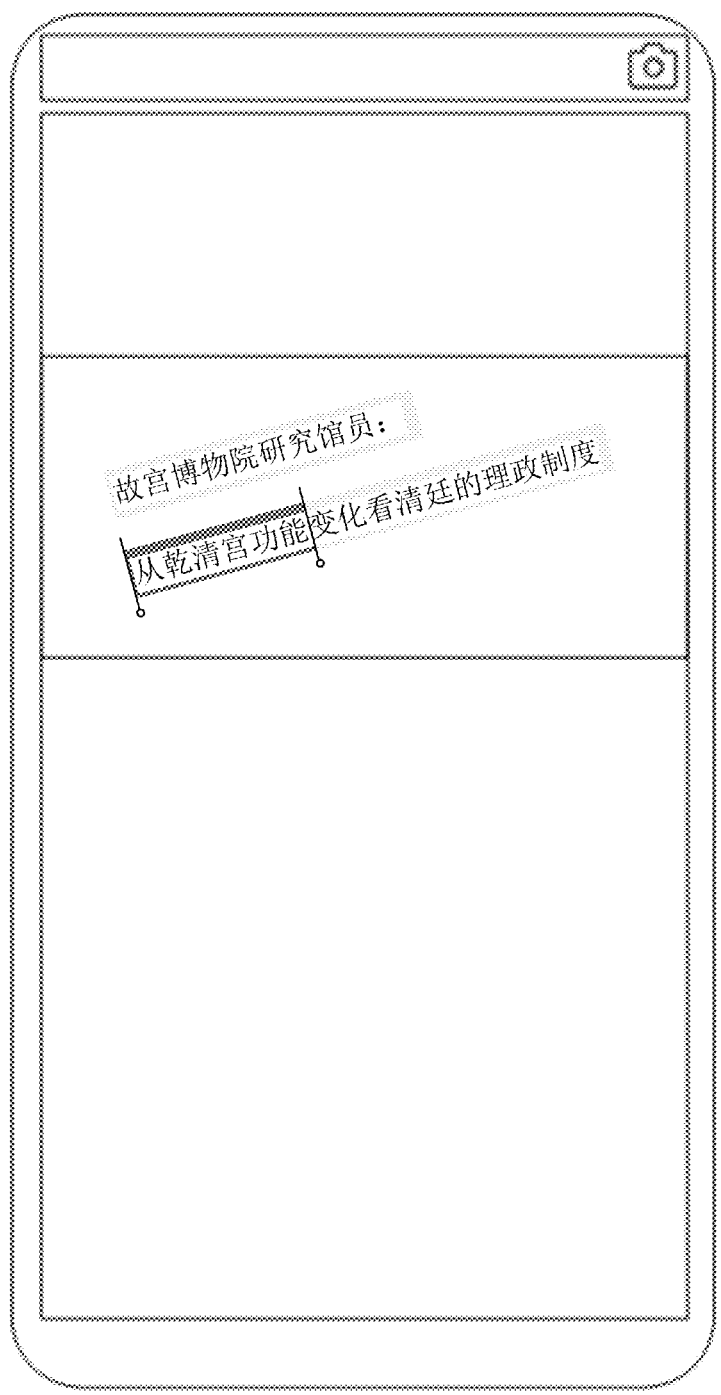
Figure 13C:
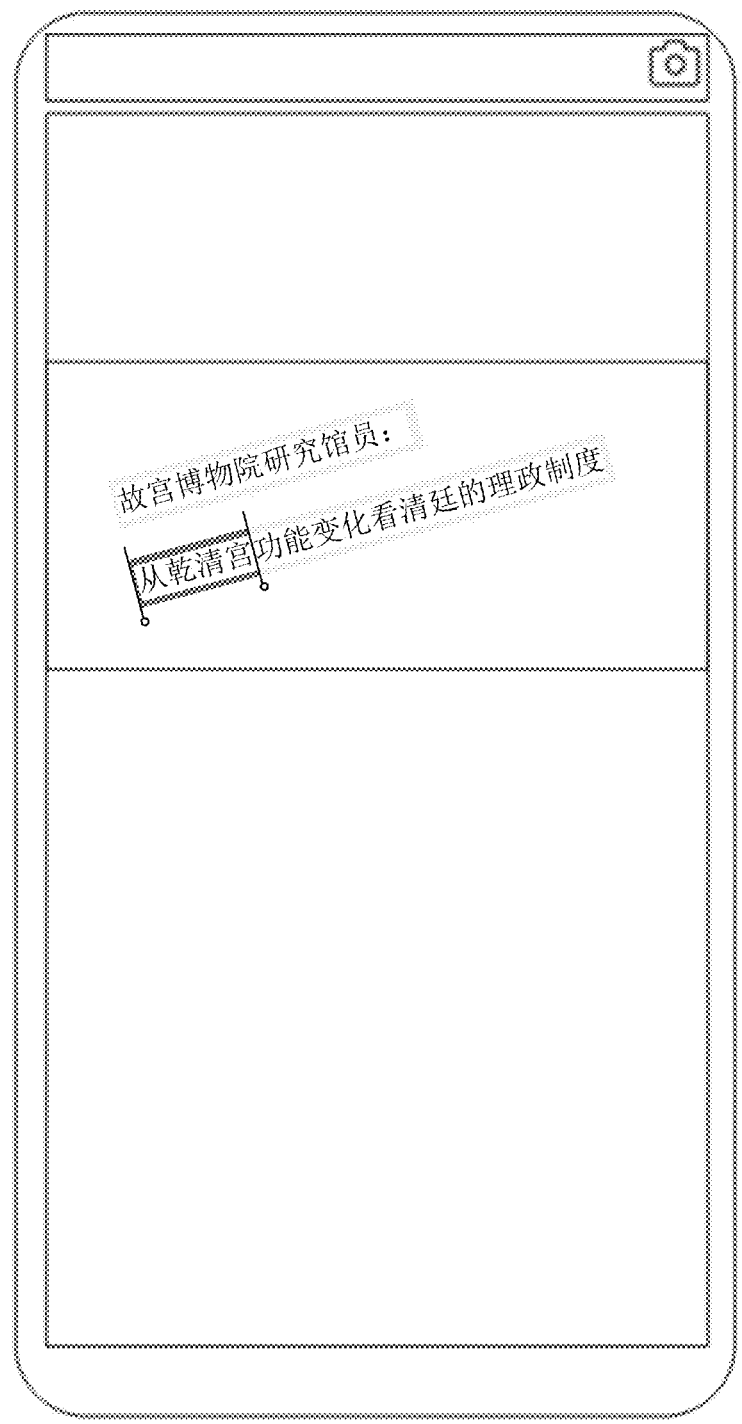

FIG. 13(a) to FIG. 13(c) are schematic diagrams presenting example effects when a character is selected by using the method for character selection. In FIG. 13(a), selected characters are "从乾清宫功能变化". The user may drag the right handle to move the right handle to the left of the character "变", to present an effect shown in FIG. 13(b). In this case, the selected characters are "从乾清宫功能". On this basis, if the user continues to drag the right handle to the left, an effect shown in FIG. 13(c) may be obtained. In this case, the selected characters are "从乾清宫".

Certainly, if the characters selected initially are "从乾清宫", the user may drag the right handle to the right to respectively present the effects shown in FIG. 13(b) and FIG. 13(a). In this process, the selected characters are sequentially "从乾清宫功能," and "从乾清宫功能变化".

In an embodiment of the application, other operation buttons may be further provided on the word card. For a presented word, the user may tap different buttons to indicate applications corresponding to the buttons to perform corresponding operations based on the presented word.

Figure 14:
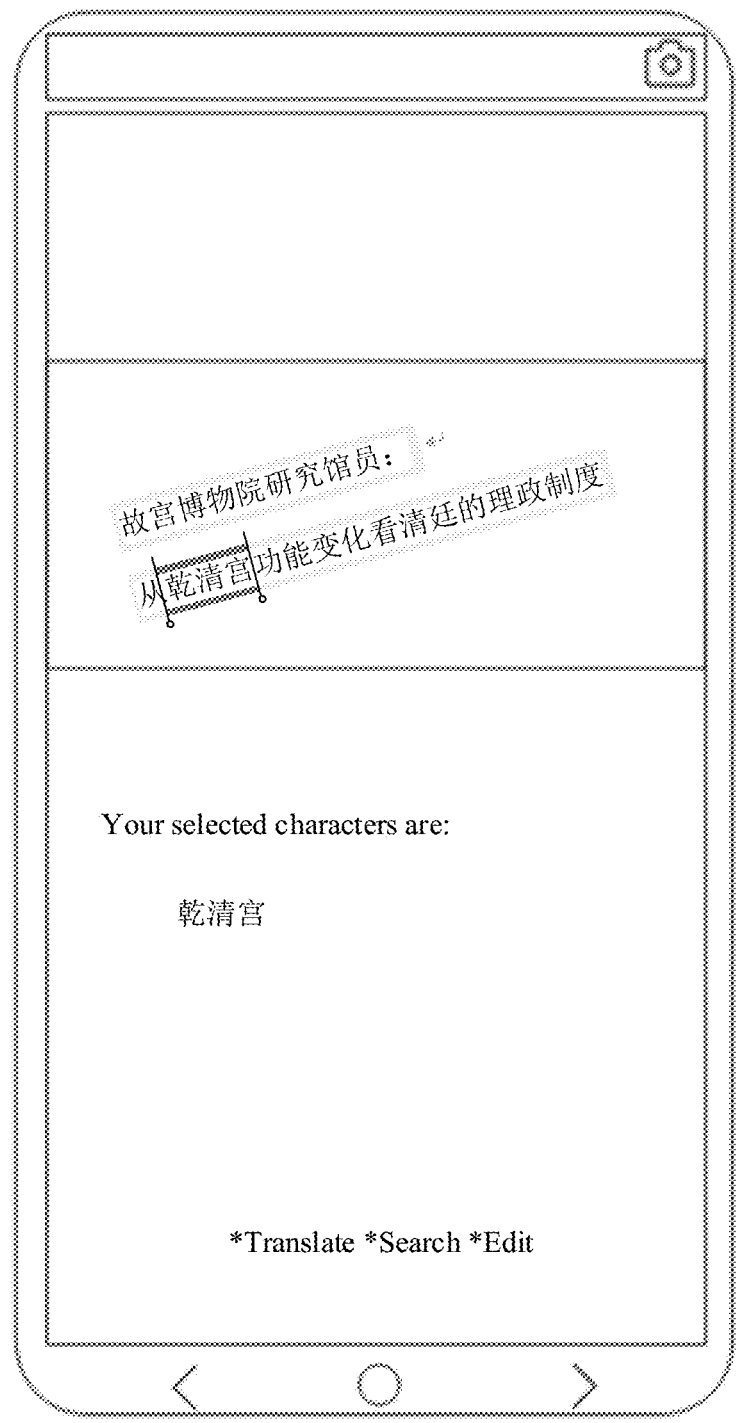
FIG. 14 is a schematic diagram of outputting a selected target character after a user selects the target character according to an embodiment of this application.

FIG. 14 is a schematic diagram of outputting a selected target character after a user selects the target character. The selected target character may be obtained after the left and right handles of the character selection control in FIG. 11(b) or FIG. 13(a) to FIG. 13(c) are dragged. For example, based on FIG. 13(c), the user may drag the left handle to the right of the character "从", to obtain a selection effect shown in FIG. 14, and currently selected target characters are "乾 清宫". In an interface of the mobile phone shown in FIG. 14, for the output selected target characters, the user may perform processing such as translation or search on the target characters by tapping a corresponding button.

In an embodiment, when it is detected through listening that the user taps a button such as translate or search, it indicates that the user expects the mobile phone to perform corresponding processing on the selected target words. In this case, the mobile phone may invoke an application that can perform the foregoing operation.

Figure 15:
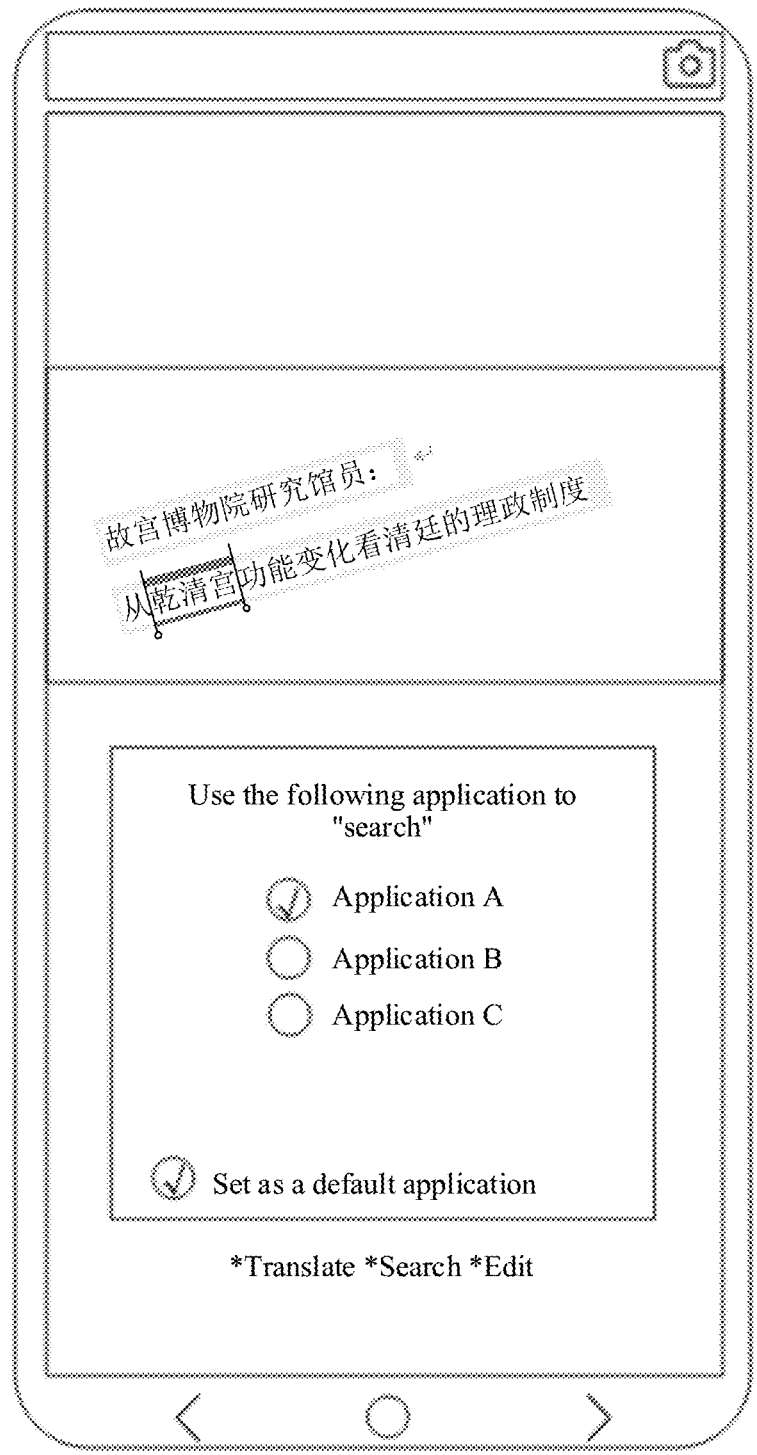
FIG. 15 is a schematic diagram of an interface for selection in a plurality of applications according to an embodiment of this application.

It should be noted that, if only one of applications installed on the mobile phone can perform a processing action expected by the user, the application may be directly invoked for processing. For example, after the user taps the "translate" button, if only one dictionary application on the mobile phone can translate the target characters, the application may be directly invoked. If more than one of the applications installed on the mobile phone can perform a processing action expected by the user, for example, after the user taps the "search" button, there are three applications (an application A, an application B, and an application C) that can perform the operation, an interface shown in FIG. 15 may be displayed in the interface of the mobile phone, so that the user can select an application to perform the operation. The user may further set a selected application as a default application. When same processing is performed subsequently, the default application may be directly invoked to perform the operation.

In an embodiment of the application, the coordinates of each character that are obtained through recognition by the character selection model are associated with the target coordinates of each character in the original picture, and a corresponding recognized text area is drawn based on the target coordinates, so that the user may be supported in arbitrary selection and range adjustment in the recognized text area. The word recognition and selection scenario may be further associated with functions such as translation and question scanning. After the user performs selection, a selected word may be translated or a recognized question may be solved directly. In addition, a character string selected by the user is parsed, and if text content in a format such as a phone number or an email address is included, a separate card may be further extracted, making it convenient for the user to directly make a call or send an email, which is relatively easy to use and practical.

It should be understood that sequence numbers of the operations do not mean execution sequences in the foregoing embodiments. The execution sequences of the processes should be determined based on functions and internal logic of the processes, and should not constitute any limitation on the implementation processes of embodiments of this application.

Figure 16:
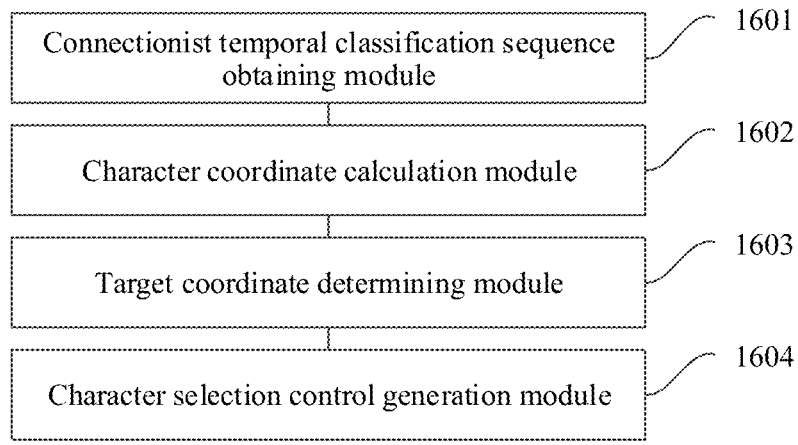
FIG. 16 is a block diagram of a structure of an apparatus for character selection based on character recognition according to an embodiment of this application.

Corresponding to the method for character selection based on character recognition that is described in the foregoing embodiment, FIG. 16 is a block diagram of a structure of an apparatus for character selection based on character recognition according to an embodiment of this application. For ease of description, only parts related to an embodiment of the application are shown.

Refer to FIG. 16. The apparatus may be applied to a terminal device, and may include the following modules:

a connectionist temporal classification sequence obtaining module 1601, configured to obtain a connectionist temporal classification sequence corresponding to text content in an original picture;

a character coordinate calculation module 1602, configured to calculate character coordinates of each character in the connectionist temporal classification sequence;

a target coordinate determining module 1603, configured to map the character coordinates of each character to the original picture, to obtain target coordinates of each character in the original picture; and a character selection control generation module 1604, configured to generate a character selection control in the original picture based on the target coordinates, where the character selection control is used to indicate a user to select a character in the original picture.

In an embodiment of the application, the connectionist temporal classification sequence obtaining module 1601 may include the following submodules:

a to-be-recognized picture generation submodule, configured to detect the original picture to generate a to-be-recognized picture including the text content; and a connectionist temporal classification sequence obtaining submodule, configured to recognize the text content to obtain the connectionist temporal classification sequence corresponding to the text content.

In an embodiment of the application, the connectionist temporal classification sequence obtaining submodule may include the following units:

an initial connectionist temporal classification sequence obtaining unit, configured to recognize the text content to obtain an initial connectionist temporal classification sequence;

a sequence length determining unit, configured to determine a length of the initial connectionist temporal classification sequence;

a picture width determining unit, configured to determine a picture width of the to-be-recognized picture; and a sequence cropping unit, configured to: if a product of the length of the initial connectionist temporal classification sequence and a preset downsampling rate is greater than the picture width of the to-be-recognized picture, crop the initial connectionist temporal classification sequence to obtain the connectionist temporal classification sequence corresponding to the text content.

A product of a length of the connectionist temporal classification sequence obtained after cropping and the preset downsampling rate is less than or equal to the picture width of the to-be-recognized picture.

In an embodiment of the application, the sequence cropping unit may include the following subunits:

a cropping subunit, configured to sequentially crop a head element or a tail element of the initial connectionist temporal classification sequence;

a calculation subunit, configured to: after any head element or tail element is cropped, perform calculation to determine whether a product of a length of a cropped initial connectionist temporal classification sequence and the preset downsampling rate is less than or equal to the picture width of the to-be-recognized picture; and an output subunit, configured to: if the product of the length of the cropped initial connectionist temporal classification sequence and the preset downsampling rate is less than or equal to the picture width of the to-be-recognized picture, stop cropping, and output the connectionist temporal classification sequence corresponding to the text content.

In an embodiment of the application, the character coordinate calculation module 1602 may include the following submodules:

a character boundary coordinate determining submodule, configured to determine character boundary coordinates of each character in the connectionist temporal classification sequence, where the character boundary coordinates include a left boundary coordinate and a right boundary coordinate; and a character coordinate calculation submodule, configured to calculate character coordinates of each character in the to-be-recognized picture based on the character boundary coordinates of each character.

In an embodiment of the application, the character boundary coordinate determining submodule may include the following units:

an original boundary coordinate obtaining unit, configured to: for any character in the connectionist temporal classification sequence, obtain an original right boundary coordinate of the character and an original left boundary coordinate of a next character;

an original boundary coordinate average calculation unit, configured to calculate an average of the original right boundary coordinate and the original left boundary coordinate; and a boundary coordinate determining unit, configured to determine a right boundary coordinate of the character and a left boundary coordinate of the next character based on the average.

In an embodiment of the application, the boundary coordinate determining unit may include the following subunits:

a character type determining subunit, configured to respectively determine a first character type of the character and a second character type of the next character, where the first character type and the second character type respectively have corresponding offsets;

a right boundary coordinate calculation subunit, configured to calculate the average minus the offset corresponding to the first character type to obtain a first difference, and use the first difference as the right boundary coordinate of the character; and a left boundary coordinate calculation subunit, configured to calculate the average plus the offset corresponding to the second character type to obtain a second sum, and use the second sum as the left boundary coordinate of the next character.

In an embodiment of the application, the character coordinates of each character in the to-be-recognized picture include first vertex coordinates, second vertex coordinates, third vertex coordinates, and fourth vertex coordinates.

The character coordinate calculation submodule may include the following units:

a first vertex coordinate and second vertex coordinate calculation unit, configured to respectively multiply the left boundary coordinate and the right boundary coordinate of each character by the preset downsampling rate, to obtain the first vertex coordinates and the second vertex coordinates of each character in the to-be-recognized picture; and a third vertex coordinate and fourth vertex coordinate calculation unit, configured to determine the third vertex coordinates and the fourth vertex coordinates of each character in the to-be-recognized picture based on the first vertex coordinates, the second vertex coordinates, and a picture height of the to-be-recognized picture.

In an embodiment of the application, the target coordinate determining module 1603 may include the following submodules:

a perspective transformation matrix determining submodule, configured to determine, based on the original picture and the to-be-recognized picture, a perspective transformation matrix used when the original picture is transformed into the to-be-recognized picture; and a target coordinate calculation submodule, configured to multiply the character coordinates of each character by the perspective transformation matrix, to obtain the target coordinates of each character in the original picture.

In an embodiment of the application, the character selection control generation module 1604 may include the following submodule:

a first color drawing submodule, configured to draw a character area of each character in a first color based on the target coordinates.

In an embodiment of the application, the character selection control generation module 1604 may further include the following submodules:

a second color drawing submodule, configured to: when a tap event of the user in a character area is detected through listening, draw an entire line of character areas including the tapped character area in a second color;

a character area adjustment submodule, configured to listen to a drag event of the user in the character area corresponding to the second color, and adjust, based on the drag event, the character area covered by the second color; and a character recognition submodule, configured to recognize and present each character in the character area covered by the second color.

In an embodiment of the application, a mapping relationship between an index in a CTC sequence output by an OCR detection and recognition model and coordinates in an original picture is established based on a characteristic of CNN downsampling (eight times) by using an existing CNN structure in the OCR detection and recognition model. The model used in the entire process is simple and an amount of data that needs to be labeled is small, and a calculation speed during processing is about 60 times faster than an algorithm used in another selection solution in which an entire picture is traversed. This may be directly adapted and deployed to an existing OCR model. Second, in an embodiment of the application, when a character boundary is determined, the character boundary may be finely adjusted by setting a hyperparameter based on different languages, to ensure accuracy of character boundary recognition, which not only is applicable to most languages, but also supports symbol selection. Third, in an embodiment of the application, boundary coordinates of each character are recorded and mapped to the original picture to obtain coordinates of each character in the original picture, so that a granularity of coordinate output is finer, and when a manual selection operation is performed, it is insensitive to ambiguity caused by segmentation between words and between a word and a symbol, and there is no problem that characters cannot be segmented, thereby achieving stronger universality in practical application.

Figure 17:
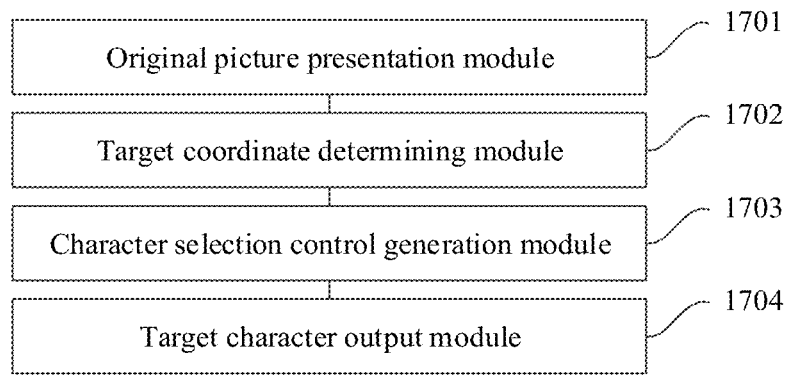
FIG. 17 is a block diagram of a structure of an apparatus for character selection based on character recognition according to another embodiment of this application.

FIG. 17 is a block diagram of a structure of an apparatus for character selection based on character recognition according to another embodiment of this application. The apparatus may be applied to a terminal device, and may include the following modules:

an original picture presentation module 1701, configured to present an original picture in a display interface of the terminal device, where the original picture includes to-be-recognized text content;

a target coordinate determining module 1702, configured to determine target coordinates, in the original picture, of each character in the text content;

a character selection control generation module 1703, configured to generate a character selection control for each character in the original picture based on the target coordinates, where the character selection control is used to indicate a user to select a character in the original picture; and a target character output module 1704, configured to: when a selection event of the user for a target character is detected through listening, output the selected target character, where the target character is any one or more of all the characters.

In an embodiment of the application, the target coordinate determining module 1702 may include the following submodules:

a connectionist temporal classification sequence obtaining submodule, configured to obtain a connectionist temporal classification sequence corresponding to the text content;

a character coordinate calculation submodule, configured to calculate character coordinates of each character in the connectionist temporal classification sequence; and a target coordinate determining submodule, configured to map the character coordinates of each character to the original picture, to obtain the target coordinates of each character in the original picture.

In an embodiment of the application, the character selection control generation module 1703 may include the following submodule:

a first color drawing submodule, configured to draw a character area of each character in a first color based on the target coordinates.

In an embodiment of the application, the target character output module 1704 may include the following submodules:

a second color drawing submodule, configured to: when a tap event of the user in a character area is detected through listening, draw an entire line of character areas including the tapped character area in a second color;

a character area adjustment submodule, configured to listen to a drag event of the user in the character area corresponding to the second color, and adjust, based on the drag event, the character area covered by the second color; and a target character recognition submodule, configured to recognize and present a target character in the character area covered by the second color.

In an embodiment of the application, the coordinates of each character that are obtained through recognition by the character selection model are associated with the target coordinates of each character in the original picture, and a corresponding recognized text area is drawn based on the target coordinates, so that the user may be supported in arbitrary selection and range adjustment in the recognized text area. The word recognition and selection scenario may be further associated with various functions. After the user performs selection, a selected word may be directly processed correspondingly, which is relatively easy to use and practical.

An apparatus embodiment is basically similar to a method embodiment, and therefore is described briefly. For related parts, refer to the descriptions in the method embodiment.

Figure 18:
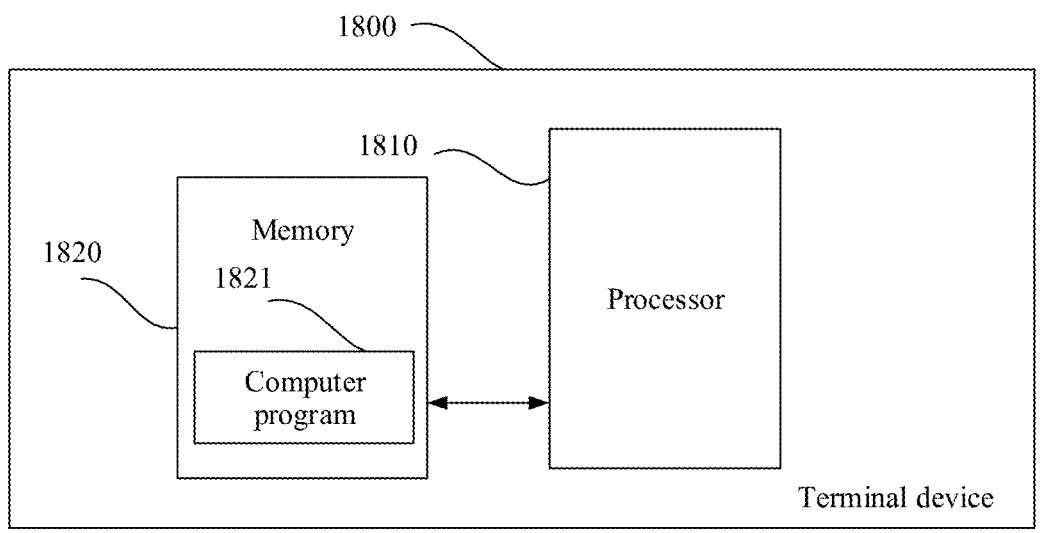
FIG. 18 is a schematic diagram of a structure of a terminal device according to an embodiment of this application.

FIG. 18 is a schematic diagram of a terminal device according to an embodiment of this application. As shown in FIG. 18, the terminal device 1800 in an embodiment includes a processor 1810, a memory 1820, and a computer program 1821 that is stored in the memory 1820 and may run on the processor 1810. When executing the computer program 1821, the processor 1810 implements operations in the embodiments of the method for character selection based on character recognition, for example, operations S901 to S906 shown in FIG. 9. Alternatively, when executing the computer program 1821, the processor 1810 implements functions of modules/units in the apparatus embodiments, for example, functions of the modules 1601 to 1604 shown in FIG. 16.

For example, the computer program 1821 may be divided into one or more modules/units. The one or more modules/units are stored in the memory 1820, and executed by the processor 1810, to complete this application. The one or more modules/units may be a series of computer program instruction segments that can complete a function, and the instruction segments may be used to describe an execution process of the computer program 1821 on the terminal device 1800. For example, the computer program 1821 may be divided into a connectionist temporal classification sequence obtaining module, a character coordinate calculation module, a target coordinate determining module, and a character selection control generation module. Functions of the modules are as follows:

The connectionist temporal classification sequence obtaining module is configured to obtain a connectionist temporal classification sequence corresponding to text content in an original picture.

The character coordinate calculation module is configured to calculate character coordinates of each character in the connectionist temporal classification sequence.

The target coordinate determining module is configured to map the character coordinates of each character to the original picture, to obtain target coordinates of each character in the original picture.

The character selection control generation module is configured to generate a character selection control in the original picture based on the target coordinates, where the character selection control is used to indicate a user to select a character in the original picture.

Alternatively, the computer program 1821 may be divided into an original picture presentation module, a target coordinate determining module, a character selection control generation module, and a target character output module. Functions of the modules are as follows:

The original picture presentation module is configured to present an original picture in a display interface of the terminal device, where the original picture includes to-be-recognized text content.

The target coordinate determining module is configured to determine target coordinates, in the original picture, of each character in the text content.

The character selection control generation module is configured to generate a character selection control for each character in the original picture based on the target coordinates, where the character selection control is used to indicate a user to select a character in the original picture.

The target character output module is configured to: when a selection event of the user for a target character is detected through listening, output the selected target character, where the target character is any one or more of all the characters.

The terminal device 1800 may be a computing device such as a desktop computer, a notebook computer, or a palmtop computer. The terminal device 1800 may include, but is not limited to, the processor 1810 and the memory 1820. One of ordinary skilled in the art may understand that FIG. 18 shows merely an example of the terminal device 1800, and does not constitute a limitation on the terminal device 1800, which may include more or fewer components than those shown in the figure, or combine some components, or have different components. For example, the terminal device 1800 may further include an input/output device, a network access device, a bus, and the like.

The processor 1810 may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory 1820 may be an internal storage unit of the terminal device 1800, for example, a hard disk or an internal memory of the terminal device 1800. The memory 1820 may alternatively be an external storage device of the terminal device 1800, for example, a plug-in hard disk, a smart media card (SMC), a secure digital (SD) card, or a flash card that is equipped on the terminal device 1800. Further, the memory 1820 may alternatively include both the internal storage unit of the terminal device 1800 and the external storage device. The memory 1820 is configured to store the computer program 1821 and other programs and data that are required by the terminal device 1800. The memory 1820 may be further configured to temporarily store data that has been output or that is to be output.

An embodiment of this application further discloses a computer-readable storage medium. The computer-readable storage medium stores a computer program. When the computer program is executed by a processor, the method for character selection based on character recognition may be implemented.

In the foregoing embodiments, the description of each embodiment has respective focuses. For a part that is not described in detail or recorded in an embodiment, refer to related descriptions in other embodiments.

One of ordinary skilled in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of this application.

In the embodiments provided in this application, it should be understood that the disclosed method and apparatus for character selection based on character recognition, and terminal device may be implemented in other manners. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, in this application, all or some procedures in the methods in the foregoing embodiments may be implemented by using a computer program instructing related hardware. The computer program may be stored in a computer-readable storage medium. When the computer program is executed by a processor, operations in the foregoing method embodiments may be implemented. The computer program includes computer program code, and the computer program code may be in a source code form, an object code form, an executable file form, some intermediate forms, or the like. The computer-readable medium may include at least any entity or apparatus capable of carrying computer program code to the apparatus for character selection based on character recognition and the terminal device, a recording medium, a computer memory, a read-only memory (ROM), a random access memory (RAM), an electrical carrier signal, a telecommunication signal, and a software distribution medium, such as a USB flash drive, a removable hard disk, a magnetic disk, or an optical disc. In some jurisdictions, a computer-readable medium cannot be an electrical carrier signal or a telecommunication signal under legislation and patent practice.

In conclusion, the foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for character selection based on character recognition, comprising:
   obtaining a connectionist temporal classification sequence corresponding to text content in an original picture, the obtaining comprising;
   recognizing the text content to obtain an initial connectionist temporal classification sequence;
   determining a length of the initial connectionist temporal classification sequence, and determining a width of a to-be-recognized picture; and
   cropping the initial connectionist temporal classification sequence to obtain a connectionist temporal classification sequence corresponding to the text content based on a preset downsampling rate, the length of the initial connectionist temporal classification sequence, and the width of the to-be-recognized picture;

calculating character coordinates of each character in the connectionist temporal classification sequence;
mapping the character coordinates of each character to the original picture, to obtain target coordinates of each character in the original picture; and
generating a character selection control in the original picture based on the target coordinates, wherein the character selection control is used to indicate a user to select a character in the original picture.

2. The method according to claim 1, wherein the obtaining the connectionist temporal classification sequence corresponding to the text content in the original picture comprises:
detecting the original picture to generate the to-be-recognized picture comprising the text content; and
recognizing the text content to obtain the connectionist temporal classification sequence corresponding to the text content.

3. The method according to claim 2, wherein the recognizing the text content to obtain the connectionist temporal classification sequence corresponding to the text content comprises:
if a product of the length of the initial connectionist temporal classification sequence and the preset downsampling rate is greater than the width of the to-be-recognized picture, cropping the initial connectionist temporal classification sequence to obtain a connectionist temporal classification sequence corresponding to the text content, wherein
a product of the length of the connectionist temporal classification sequence obtained after cropping and the preset downsampling rate is less than or equal to the width of the to-be-recognized picture.

4. The method according to claim 3, wherein the cropping the initial connectionist temporal classification sequence to obtain the connectionist temporal classification sequence corresponding to the text content comprises:
sequentially cropping a head element or a tail element of the initial connectionist temporal classification sequence;
after any head element or the tail element is cropped, calculating whether a product of a length of a cropped initial connectionist temporal classification sequence and the preset downsampling rate is less than or equal to the width of the to-be-recognized picture; and
if the product of the length of the cropped initial connectionist temporal classification sequence and the preset downsampling rate is less than or equal to the width of the to-be-recognized picture, stopping cropping, and outputting the connectionist temporal classification sequence corresponding to the text content.

5. The method according to claim 2, wherein the mapping the character coordinates of each character to the original picture, to obtain the target coordinates of each character in the original picture comprises:
determining, based on the original picture and the to-be-recognized picture, a perspective transformation matrix used when the original picture is transformed into the to-be-recognized picture; and
multiplying the character coordinates of each character by the perspective transformation matrix, to obtain the target coordinates of each character in the original picture.

6. The method according to claim 5, wherein the generating the character selection control in the original picture based on the target coordinates comprises:
drawing a character area of each character in a first color based on the target coordinates.

7. The method according to claim 6, further comprising:
when a tap event of the user in a character area is detected through listening, drawing, in a second color, an entire line of character areas comprising the tapped character area;
when a drag event of the user in the character area corresponding to the second color is detected through listening, adjusting, based on the drag event, the character area covered by the second color; and
recognizing and presenting each character in the character area covered by the second color.

8. The method according to claim 1, wherein the calculating the character coordinates of each character in the connectionist temporal classification sequence comprises:
determining character boundary coordinates of each character in the connectionist temporal classification sequence, wherein the character boundary coordinates comprise left boundary coordinates and right boundary coordinates; and
calculating character coordinates of each character in a to-be-recognized picture based on the character boundary coordinates of each character.

9. The method according to claim 8, wherein the determining the character boundary coordinates of each character in the connectionist temporal classification sequence comprises:
obtaining, for any character in the connectionist temporal classification sequence, an original right boundary coordinate of the character and an original left boundary coordinate of a next character;
calculating an average of the original right boundary coordinate and the original left boundary coordinate; and
obtaining a right boundary coordinate of the character and a left boundary coordinate of the next character based on the average.

10. The method according to claim 9, wherein the obtaining the right boundary coordinate of the character and the left boundary coordinate of the next character based on the average comprises:
respectively determining a first character type of the character and a second character type of the next character, wherein the first character type and the second character type respectively have corresponding offsets;
calculating the average minus an offset corresponding to the first character type to obtain a first difference, and using the first difference as the right boundary coordinate of the character; and
calculating the average plus an offset corresponding to the second character type, to obtain a second sum, and using the second sum as the left boundary coordinate of the character.

11. The method according to claim 8, wherein the character coordinates of each character in the to-be-recognized picture comprise first vertex coordinates, second vertex coordinates, third vertex coordinates, and fourth vertex coordinates; and
the calculating the character coordinates of each character in the to-be-recognized picture based on the character boundary coordinates of each character comprises:
respectively multiplying a left boundary coordinate and a right boundary coordinate of each character by the preset downsampling rate, to obtain the first vertex coordinates and the second vertex coordinates of each character in the to-be-recognized picture; and determining the third vertex coordinates and the fourth vertex coordinates of each character in the to-be-recognized picture based on the first vertex coordinates, the second vertex coordinates, and a picture height of the to-be-recognized picture.

12. A terminal device, comprising:

a memory to store instructions, a processor coupled to the memory, wherein the instructions, when executed by the processor, cause the processor to perform operations of character selection based on character recognition, the operations comprising:

obtaining a connectionist temporal classification sequence corresponding to text content in an original picture, the obtaining comprising;

recognizing the text content to obtain an initial connectionist temporal classification sequence;

determining a length of the initial connectionist temporal classification sequence, and determining a width of a to-be-recognized picture; and cropping the initial connectionist temporal classification sequence to obtain a connectionist temporal classification sequence corresponding to the text content based on a preset downsampling rate, the length of the initial connectionist temporal classification sequence, and the width of the to-be-recognized picture;

calculating character coordinates of each character in the connectionist temporal classification sequence;

mapping the character coordinates of each character to the original picture, to obtain target coordinates of each character in the original picture; and generating a character selection control in the original picture based on the target coordinates, wherein the character selection control is used to indicate a user to select a character in the original picture.

13. The terminal device according to claim 12, wherein the operations further comprise:

detecting the original picture to generate the to-be-recognized picture comprising the text content; and recognizing the text content to obtain the connectionist temporal classification sequence corresponding to the text content.

14. The terminal device according to claim 13, wherein the operations further comprise:

if a product of the length of the initial connectionist temporal classification sequence and the preset downsampling rate is greater than the width of the to-be-recognized picture, cropping the initial connectionist temporal classification sequence to obtain a connectionist temporal classification sequence corresponding to the text content, wherein a product of the length of the connectionist temporal classification sequence obtained after cropping and the preset downsampling rate is less than or equal to the width of the to-be-recognized picture.

15. The terminal device according to claim 14, wherein the operations further comprise:

sequentially cropping a head element or a tail element of the initial connectionist temporal classification sequence;

after any head element or the tail element is cropped, calculating whether a product of a length of a cropped initial connectionist temporal classification sequence and the preset downsampling rate is less than or equal to the width of the to-be-recognized picture; and if the product of the length of the cropped initial connectionist temporal classification sequence and the preset downsampling rate is less than or equal to the width of the to-be-recognized picture, stopping cropping, and outputting the connectionist temporal classification sequence corresponding to the text content.

16. The terminal device according to claim 12, wherein the operations further comprise:

determining character boundary coordinates of each character in the connectionist temporal classification sequence, wherein the character boundary coordinates comprise left boundary coordinates and right boundary coordinates; and calculating character coordinates of each character in the to-be-recognized picture based on the character boundary coordinates of each character.

17. The terminal device according to claim 16, wherein the operations further comprise:

obtaining, for any character in the connectionist temporal classification sequence, an original right boundary coordinate of the character and an original left boundary coordinate of a next character;

calculating an average of the original right boundary coordinate and the original left boundary coordinate; and obtaining a right boundary coordinate of the character and a left boundary coordinate of the next character based on the average.

18. The terminal device according to claim 17, wherein the operations further comprise:

respectively determining a first character type of the character and a second character type of the next character, wherein the first character type and the second character type respectively have corresponding offsets;

calculating the average minus an offset corresponding to the first character type to obtain a first difference, and using the first difference as the right boundary coordinate of the character; and calculating the average plus an offset corresponding to the second character type, to obtain a second sum, and using the second sum as the left boundary coordinate of the character.

19. The terminal device according to claim 16, wherein the character coordinates of each character in the to-be-recognized picture comprise first vertex coordinates, second vertex coordinates, third vertex coordinates, and fourth vertex coordinates; and wherein the operations further comprise:

respectively multiplying a left boundary coordinate and a right boundary coordinate of each character by the preset downsampling rate, to obtain the first vertex coordinates and the second vertex coordinates of each character in the to-be-recognized picture; and determining the third vertex coordinates and the fourth vertex coordinates of each character in the to-be-recognized picture based on the first vertex coordinates, the second vertex coordinates, and a picture height of the to-be-recognized picture.

20. A non-transitory machine-readable storage medium having instructions stored therein, which when executed by a processor, cause the processor to perform operations of character selection based on character recognition, the operations comprising:

obtaining a connectionist temporal classification sequence corresponding to text content in an original picture, the obtaining comprising;
  recognizing the text content to obtain an initial connectionist temporal classification sequence;
  determining a length of the initial connectionist temporal classification sequence, and determining a width of a to-be-recognized picture; and
cropping the initial connectionist temporal classification sequence to obtain a connectionist temporal classification sequence corresponding to the text content based on a preset downsampling rate, the length of the initial connectionist temporal classification sequence, and the width of the to-be-recognized picture;
calculating character coordinates of each character in the connectionist temporal classification sequence;
mapping the character coordinates of each character to the original picture, to obtain target coordinates of each character in the original picture; and
generating a character selection control in the original picture based on the target coordinates, wherein the character selection control is used to indicate a user to select a character in the original picture.

\* \* \* \* \*